(12) United States Patent
Zheng et al.

(10) Patent No.: US 9,754,226 B2
(45) Date of Patent: Sep. 5, 2017

(54) URBAN COMPUTING OF ROUTE-ORIENTED VEHICLES

(75) Inventors: Yu Zheng, Beijing (CN); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/324,758

(22) Filed: Dec. 13, 2011

(65) Prior Publication Data

US 2013/0151297 A1 Jun. 13, 2013

(51) Int. Cl.
*G06Q 10/06* (2012.01)
*G08G 1/01* (2006.01)

(52) U.S. Cl.
CPC ........... *G06Q 10/06* (2013.01); *G08G 1/0112* (2013.01); *G08G 1/0129* (2013.01)

(58) Field of Classification Search
CPC ...................................... G06Q 10/06
USPC ....................................... 705/7.26
See application file for complete search history.

(56) References Cited

U.S. PATENT DOCUMENTS

| 5,428,546 A | | 6/1995 | Shah et al. |
| 5,802,492 A | | 9/1998 | DeLorme et al. |
| 5,845,227 A | * | 12/1998 | Peterson ........................ 701/420 |
| 5,904,727 A | | 5/1999 | Prabhakaran |
| 6,023,241 A | | 2/2000 | Clapper |
| 6,091,359 A | | 7/2000 | Geier |
| 6,091,956 A | * | 7/2000 | Hollenberg ................. 455/456.5 |
| 6,122,628 A | | 9/2000 | Castelli et al. |

(Continued)

FOREIGN PATENT DOCUMENTS

| EP | 1087605 A2 | 3/2001 |
| GB | 2421653 A | 6/2006 |

(Continued)

OTHER PUBLICATIONS

Yong Ge, Hui Xiong, Alexander Tuzhilin, Keli Xiao, Marco Gruteser, Michael J.Pazzani , An Energy-Efficient Mobile Recommender System, National Science Foundation, Rutgers CCC Green Computing Initiative, National Natural Science Foundation, http://pegasus.rutgers.edu/~yongge/KDD10-MRS.pdf.*

(Continued)

*Primary Examiner* — Kurtis Gills
(74) *Attorney, Agent, or Firm* — Schwegman Lundberg & Woessner, P.A.

(57) ABSTRACT

Techniques for analyzing effectiveness of an urban area based on traffic patterns collected from route-oriented vehicles. A process collects sequences of global positioning system (GPS) points in logs and identifies geographical locations to represent the urban area where the route-oriented vehicles traveled. The process models traffic patterns by: partitioning the urban area into regions based at least in part on major roads, segmenting the GPS points from the logs into time slots, and identifying the GPS points associated with transporting a passenger in the route-oriented vehicles. The process models traffic patterns by projecting the identified GPS points onto the regions to construct transitions of the identified GPS points travelling between the regions. Then the process builds a matrix of the regions for each time slot in each day based on a number of the transitions. Each item in the matrix represents an effectiveness of a connection between two regions.

20 Claims, 14 Drawing Sheets

(56) References Cited

U.S. PATENT DOCUMENTS

| | | | |
|---|---|---|---|
| 6,128,279 A | 10/2000 | O'Neil et al. | |
| 6,219,662 B1 | 4/2001 | Fuh et al. | |
| 6,243,647 B1 | 6/2001 | Berstis et al. | |
| 6,317,684 B1 | 11/2001 | Roeseler et al. | |
| 6,317,686 B1 | 11/2001 | Ran | |
| 6,351,775 B1 | 2/2002 | Yu | |
| 6,356,838 B1 | 3/2002 | Paul | |
| 6,385,539 B1 | 5/2002 | Wilson et al. | |
| 6,411,897 B1 | 6/2002 | Gaspard, II | |
| 6,424,370 B1 | 7/2002 | Courtney | |
| 6,427,122 B1 | 7/2002 | Lin | |
| 6,430,547 B1 | 8/2002 | Busche et al. | |
| 6,446,121 B1 | 9/2002 | Shah et al. | |
| 6,493,650 B1 | 12/2002 | Rodgers et al. | |
| 6,496,814 B1 | 12/2002 | Busche | |
| 6,513,026 B1 | 1/2003 | Horvitz et al. | |
| 6,516,272 B2 | 2/2003 | Lin | |
| 6,553,310 B1 | 4/2003 | Lopke | |
| 6,584,401 B2 | 6/2003 | Kirshenbaum et al. | |
| 6,606,643 B1 | 8/2003 | Emens et al. | |
| 6,611,881 B1 | 8/2003 | Gottfurcht et al. | |
| 6,615,130 B2 | 9/2003 | Myr | |
| 6,618,507 B1 | 9/2003 | Divakaran et al. | |
| 6,625,319 B1 | 9/2003 | Krishnamachari | |
| 6,724,733 B1 | 4/2004 | Schuba et al. | |
| 6,732,120 B1 | 5/2004 | Du | |
| 6,785,704 B1 | 8/2004 | McCanne | |
| 6,816,779 B2 | 11/2004 | Chen et al. | |
| RE38,724 E * | 4/2005 | Peterson | 701/414 |
| 6,904,160 B2 | 6/2005 | Burgess | |
| 6,919,842 B2 | 7/2005 | Cho | |
| 6,925,447 B2 | 8/2005 | McMenimen et al. | |
| 6,965,827 B1 | 11/2005 | Wolfson | |
| 6,970,884 B2 | 11/2005 | Aggarwal | |
| 6,981,055 B1 | 12/2005 | Ahuja et al. | |
| 7,003,555 B1 | 2/2006 | Jungck | |
| 7,013,290 B2 | 3/2006 | Ananian | |
| 7,013,517 B2 | 3/2006 | Kropf | |
| 7,031,517 B1 | 4/2006 | Le et al. | |
| 7,062,562 B1 | 6/2006 | Baker et al. | |
| 7,111,061 B2 | 9/2006 | Leighton et al. | |
| 7,136,932 B1 | 11/2006 | Schneider | |
| 7,152,118 B2 | 12/2006 | Anderson, IV et al. | |
| 7,155,456 B2 | 12/2006 | Abbott, III et al. | |
| 7,171,415 B2 | 1/2007 | Kan et al. | |
| 7,194,552 B1 | 3/2007 | Schneider | |
| 7,197,500 B1 | 3/2007 | Israni et al. | |
| 7,203,693 B2 | 4/2007 | Carlbom et al. | |
| 7,219,067 B1 | 5/2007 | McMullen et al. | |
| 7,228,359 B1 | 6/2007 | Monteiro | |
| 7,233,861 B2 | 6/2007 | Van Buer et al. | |
| 7,239,962 B2 | 7/2007 | Plutowski | |
| 7,281,199 B1 | 10/2007 | Nicol et al. | |
| 7,284,051 B1 | 10/2007 | Okano et al. | |
| 7,349,768 B2 | 3/2008 | Bruce et al. | |
| 7,366,726 B2 | 4/2008 | Bellamy et al. | |
| 7,389,283 B2 | 6/2008 | Adler | |
| 7,395,250 B1 | 7/2008 | Aggarwal et al. | |
| 7,428,551 B2 | 9/2008 | Luo et al. | |
| 7,437,239 B2 | 10/2008 | Serre | |
| 7,437,372 B2 | 10/2008 | Chen et al. | |
| 7,447,588 B1 | 11/2008 | Xu et al. | |
| 7,479,897 B2 | 1/2009 | Gertsch et al. | |
| 7,493,294 B2 | 2/2009 | Flinn et al. | |
| 7,519,690 B1 | 4/2009 | Barrow et al. | |
| 7,548,936 B2 | 6/2009 | Liu et al. | |
| 7,561,959 B2 | 7/2009 | Hopkins et al. | |
| 7,574,508 B1 | 8/2009 | Kommula | |
| 7,584,159 B1 | 9/2009 | Chakrabarti et al. | |
| 7,584,301 B1 | 9/2009 | Joshi | |
| 7,603,233 B2 | 10/2009 | Tashiro | |
| 7,610,151 B2 | 10/2009 | Letchner et al. | |
| 7,660,441 B2 | 2/2010 | Chen et al. | |
| 7,685,422 B2 | 3/2010 | Isozaki et al. | |
| 7,706,964 B2 | 4/2010 | Horvitz et al. | |
| 7,707,314 B2 | 4/2010 | McCarthy et al. | |
| 7,710,984 B2 | 5/2010 | Dunk | |
| 7,739,040 B2 | 6/2010 | Horvitz | |
| 7,801,842 B2 | 9/2010 | Dalton | |
| 7,840,407 B2 | 11/2010 | Strope et al. | |
| 7,860,891 B2 | 12/2010 | Adler et al. | |
| 7,904,530 B2 | 3/2011 | Partridge et al. | |
| 7,920,965 B1 | 4/2011 | Nesbitt et al. | |
| 7,930,427 B2 | 4/2011 | Josefsberg et al. | |
| 7,948,400 B2 | 5/2011 | Horvitz et al. | |
| 7,982,635 B2 | 7/2011 | Seong | |
| 7,984,006 B2 | 7/2011 | Price | |
| 7,991,879 B2 | 8/2011 | Josefsberg et al. | |
| 8,060,462 B2 | 11/2011 | Flinn et al. | |
| 8,117,138 B2 | 2/2012 | Apte et al. | |
| 8,135,505 B2 | 3/2012 | Vengroff et al. | |
| 8,190,649 B2 | 5/2012 | Bailly | |
| 8,219,112 B1 | 7/2012 | Youssef et al. | |
| 8,275,649 B2 | 9/2012 | Zheng et al. | |
| 8,458,298 B2 | 6/2013 | Josefsberg et al. | |
| 8,562,439 B2 | 10/2013 | Shuman et al. | |
| 8,577,380 B2 | 11/2013 | Frias Martinez et al. | |
| 9,009,177 B2 | 4/2015 | Zheng et al. | |
| 2001/0029425 A1 | 10/2001 | Myr | |
| 2002/0032689 A1 | 3/2002 | Abbott, III et al. | |
| 2002/0038360 A1 | 3/2002 | Andrews et al. | |
| 2002/0044690 A1 | 4/2002 | Burgess | |
| 2002/0052873 A1 | 5/2002 | Delgado et al. | |
| 2002/0062193 A1 | 5/2002 | Lin | |
| 2002/0077749 A1 | 6/2002 | Doi | |
| 2002/0128768 A1 | 9/2002 | Nakano et al. | |
| 2003/0053424 A1 | 3/2003 | Krishnamurthy et al. | |
| 2003/0063133 A1 | 4/2003 | Foote et al. | |
| 2003/0069893 A1 | 4/2003 | Kanai et al. | |
| 2003/0069968 A1 | 4/2003 | O'Neil et al. | |
| 2003/0139898 A1 | 7/2003 | Miller et al. | |
| 2003/0140040 A1 | 7/2003 | Schiller | |
| 2003/0195810 A1 | 10/2003 | Raghupathy et al. | |
| 2003/0212689 A1 | 11/2003 | Chen et al. | |
| 2003/0217070 A1 | 11/2003 | Gotoh et al. | |
| 2003/0229697 A1 | 12/2003 | Borella | |
| 2004/0039798 A1 | 2/2004 | Hotz et al. | |
| 2004/0064338 A1 | 4/2004 | Shiota et al. | |
| 2004/0073640 A1 | 4/2004 | Martin et al. | |
| 2004/0117358 A1 | 6/2004 | von Kaenel et al. | |
| 2004/0196161 A1 * | 10/2004 | Bell et al. | 340/905 |
| 2004/0198386 A1 | 10/2004 | Dupray | |
| 2004/0217884 A1 | 11/2004 | Samadani et al. | |
| 2004/0220965 A1 | 11/2004 | Harville et al. | |
| 2004/0264465 A1 | 12/2004 | Dunk | |
| 2005/0004830 A1 | 1/2005 | Rozell et al. | |
| 2005/0004903 A1 | 1/2005 | Tsuda | |
| 2005/0031296 A1 | 2/2005 | Grosvenor | |
| 2005/0075116 A1 | 4/2005 | Laird et al. | |
| 2005/0075119 A1 | 4/2005 | Sheha et al. | |
| 2005/0075782 A1 | 4/2005 | Torgunrud | |
| 2005/0075784 A1 | 4/2005 | Gray et al. | |
| 2005/0080554 A1 | 4/2005 | Ono et al. | |
| 2005/0108261 A1 | 5/2005 | Glassy et al. | |
| 2005/0131889 A1 | 6/2005 | Bennett et al. | |
| 2005/0198286 A1 | 9/2005 | Xu et al. | |
| 2005/0203927 A1 | 9/2005 | Sull et al. | |
| 2005/0225678 A1 | 10/2005 | Zisserman et al. | |
| 2005/0231394 A1 | 10/2005 | Machii et al. | |
| 2005/0265317 A1 | 12/2005 | Reeves et al. | |
| 2005/0278371 A1 | 12/2005 | Funk et al. | |
| 2006/0020597 A1 | 1/2006 | Keating et al. | |
| 2006/0036630 A1 | 2/2006 | Gray | |
| 2006/0042483 A1 | 3/2006 | Work et al. | |
| 2006/0075139 A1 | 4/2006 | Jungck | |
| 2006/0085177 A1 | 4/2006 | Toyama et al. | |
| 2006/0085419 A1 | 4/2006 | Rosen | |
| 2006/0090122 A1 | 4/2006 | Pyhalammi et al. | |
| 2006/0095540 A1 | 5/2006 | Anderson et al. | |
| 2006/0101377 A1 | 5/2006 | Toyama et al. | |
| 2006/0129675 A1 | 6/2006 | Zimmer et al. | |
| 2006/0143442 A1 | 6/2006 | Smith | |
| 2006/0149464 A1 | 7/2006 | Chien | |
| 2006/0155464 A1 | 7/2006 | Smartt | |

(56) References Cited

U.S. PATENT DOCUMENTS

| | | |
|---|---|---|
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1* | 11/2006 | Wang et al. ............... 701/117 |
| 2006/0251292 A1 | 11/2006 | Gokturk et al. |
| 2006/0265125 A1 | 11/2006 | Glaza |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1* | 10/2008 | Anderson et al. ............ 701/201 |
| 2008/0312822 A1 | 12/2008 | Lucas et al. |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1* | 11/2010 | Jin et al. ............... 455/62 |
| 2010/0312461 A1* | 12/2010 | Haynie et al. ............ 701/117 |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1* | 7/2011 | Chapman et al. ............ 705/1.1 |
| 2011/0176000 A1* | 7/2011 | Budge et al. ............... 348/143 |
| 2011/0184949 A1 | 7/2011 | Luo |
| 2011/0191011 A1* | 8/2011 | McBride et al. ............ 701/117 |
| 2011/0191284 A1 | 8/2011 | Dalton |
| 2011/0208419 A1* | 8/2011 | Boss et al. ............... 701/201 |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1* | 6/2012 | Chapman et al. ............ 701/119 |
| 2012/0256770 A1 | 10/2012 | Mitchell |
| 2013/0166188 A1 | 6/2013 | Zheng et al. |
| 2014/0088791 A1 | 3/2014 | Alpert et al. |
| 2015/0117713 A1 | 4/2015 | Zheng et al. |
| 2015/0186389 A1 | 7/2015 | Zheng et al. |
| 2016/0232179 A1 | 8/2016 | Zheng et al. |
| 2017/0131110 A1 | 5/2017 | Zheng et al. |

FOREIGN PATENT DOCUMENTS

| | | | |
|---|---|---|---|
| JP | EP1087602 A2 | 3/2001 | |
| JP | 2002140362 | 5/2002 | |
| JP | 2002304408 A | 10/2002 | |
| JP | 2003044503 A | 2/2003 | |
| KR | 20050072555 A | 7/2005 | |
| KR | 20060006271 A | 1/2006 | |
| KR | 100650389 B1 | 11/2006 | |
| WO | WO2006097907 A2 | 9/2006 | |
| WO | 2007/010317 A1 * | 1/2007 | ............ 701/117 |
| WO | WO2007087615 A2 | 8/2007 | |
| WO | WO2007145625 A1 | 12/2007 | |
| WO | WO2009053411 A1 | 4/2009 | |
| WO | WO2010062726 A2 | 6/2010 | |

OTHER PUBLICATIONS

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.

Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.

Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, Mar. 1995, 12 pgs.

Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.

Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).

(56) References Cited

OTHER PUBLICATIONS

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.
Amato, et al., "Region Based Image Similarity Search Inspired by Text Search", Third Italian Research Conference on Digital Library Systems, Padova, Italy, Jan. 29-30, 2007, pp. 78-85.
Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.
Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.
"Bikely Reviews", website, 2010, 1 page, retrieved on Apr. 16, 2010 at <<http://www.bikely.com/>>.
bing.com, Maps, Retrieved on Dec. 28, 2009 at <<http://cn.bing.com/ditu/>>, 2 pgs.
Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.
Borzsonyi, et al., The Skyline Operator, In Proc. ICDE 2001, IEEE Press: 421-430, <<http://ieeexplore.ieee.org/stamp/stamp.jsp?tp=&arnumber=914855>>.
Brakatsoulas, et al., "On Map-Matching Vehicle Tracking Data", VLDB Endowment, In the Proceedings of the 31st International Conference on Very Large Data Bases, Sep. 2005, pp. 853-864.
Brauckhoff, et al., Applying PCA for Traffic Anomaly Detection: Problems and Solutions, IEEE, 2009, 5 pages.
Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.
Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.
Bu, et al., Efficient Anomaly Monitoring Over Moving Object Trajectory Streams, KDD 2009, ACM, 2009, 9 pages.
Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.
Cao, et al., Mining Frequent Spatio-temporal Sequential Patterns, Proceedings of the 5th IEEE International Conference on Data Mining 2005, pp. 82-89, 2005.
Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.
Chawathe, "Segment-Based Map Matching", In the Proceedings of the IEEE Intelligent Vehicles Symposium, Jun. 13-15, 2007, pp. 1190-1197.
Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.
Chen, et al., GLS-SOD: A Generalized Local Statistical Approach for Spatial Outlier Detection, Proceedings of KDD 2010, ACM, 2010, pp. 1069-1078.

Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp+norms+and+edit+distance&ei=_ezGS62IE439__Aa1qlzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.
Chen, et al., Robust and Fast Similarity Search for Moving Object Trajectories, Proceedings of SIGMOD 2005, 12 pages, 2005 ACM.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.
Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.
Das, et al., Anomaly Detection and Spatial-Temporal Analysis of Global Climate System, Proceedings of SensorKDD 2009, 9 pages, 2009 ACM.
Datta, et al., "Image Retrieval: Ideas, Influences, and Trends of the New Age", ACM Computing Surveys, vol. 40, No. 2, Article 5, Apr. 2008, pp. 1-60.
Deerwester, et al., "Indexing by Latent Semantic Analysis", J. Amer. Soc. Info. Sci., vol. 41, No. 6, Jan. 1990, 34 pages.
Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.
Dubuisson et al., "A Modified Hausdorff Distance for Object Matching", Proceedings of the 12th IAPR International on Conference Pattern Recognition, Computer Vision & Image Processing, vol. 1, Oct. 9-13, 1994, pp. 566-568.
Eagle, et al., Community Computing: Comparisons between Rural and Urban Societies using Mobile Phone Data, IEEE Social Computing, 144-150, <<http://reality.media.mit.edu/pdfs/Eagle_community.pdf>>.
Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.
Eagle et al, "Reality mining: sensing complex social systems", Springer-Verlag London, Personal and Ubiquitous Computing, vol. 10, Issue 4, Mar. 2006, pp. 255-268.
Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.
Estkowski, No Steiner Point Subdivision Simplification is NP-Complete, In Proceedings of the 10th Canadian Conference on Computational Geometry, pp. 11-20, 1998
Faloutsos et al, "Fast Subsequence Matching in Time-Series Databases," Proceedings of the 1994 ACM SIGMOD International Conference on Management of Data , vol. 23, No. 2, Jun. 1994, 11 pgs.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Ge, et al., An Energy-Efficient Mobile Recommender System. In Proc. KDD 2010, ACM Press 2010, <<http://pegasus.rutgers.

(56) References Cited

OTHER PUBLICATIONS edu/~kelixiao/papers/An%20Energy-Efficient%20Mobile%20Recommender%20System.pdf>>.

Ge, et al., Top-Eye: Top-k Evolving Trajectory Outlier Detection, Proceedings of CIKM 2010, Toronto, Canada, 4 pages.

Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.

Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.

Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.

Gonzalez, Han, Li, Myslinska, Sondag, "Adaptive Fastest Path Computation on a Road Network: A Traffic Mining Approach", retrieved on Dec. 24, 2009 at <<http://www.cs.uiuc.edu/~hanj/pdf/vldb07_hagonzal.pdf>>, Published by VLDB Endowment, Proceedings of Conference on Very Large Data Bases, Novel Data Mining Applications, Sep. 23, 2007, pp. 794-805.

Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.

"GPS Track Route Exchange Forum", 2010 GPSXchange.com website, 3 pages, retrieved on Apr. 16, 2010 at <<http://www.gpsxchange.com/phpBB2/index.php>>.

"GPS-Waypoints", retrieved on Apr. 15, 2010 at <<http://www.gps-waypoints.net/>>, 2010, pp. 1.

Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=2870l6708l0l10140l2l2l0l0l0l0l266l438l0.1.1l2l0&bav=on.2,or.r_gc.r_pw.,cf.osb&fp=533a712cc6ce8ba0&biw=1280&bih=808>>, 2008, pp. 1-2.

Greenfeld, "Matching GPS Observations to Locations on a Digital Map", In the Proceedings of the 81st Annual Meeting of the Transportation Research Board, Washington DC, Jan. 2002, 13 pgs.

Guehnemann, et al., Monitoring traffic and emissions by floating car data. Institute of transport studies Australia; 2004, <<http://elib.dlr.de/6675/1/its_wp_04-07.pdf>>.

Gustaysen, "Condor—an application framework for mobility-based context-aware applications", retrieved on Aug. 4, 2009 at <<http://www.comp.lancs.ac.uk/~dixa/conf/ubicomp2002-models/pdf/Gustaysen-goteborg%20sept-02.pdf>>, UBICOMP 2002, 2002, pp. 1-6.

Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.

Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0_AaCpICHDQ&usg=AFQjCNFtQttNVHCKYJQZcH052-KmCxIZ0g>>, ACM, Proceedings of Conference on Management of Data,1984, pp. 47-57.

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.

Hariharan, et al., "Project Lachesis: Parsing and Modeling Location Histories", ACM, In the Proceedings of GIScience, 2004, pp. 106-124.

Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.

Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.

Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.

Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.

Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.

Kavouras, et al., "A Method for the Formalization and Integration of Geographic Categorizations", Draft version from the International Journal of Geographic Information Science, vol. 16, No. 5, 2002, pp. 439-453.

Ke, et al., "Correlated Pattern Mining in Quantitative Databases", ACM Transactions on Database Systems, vol. V, No. N, Apr. 2008, 44 pages.

Ke, et al., "Efficient Correlations Search from Graph Databases", IEEE Transactions on Knowledge and Data Engineering, vol. 20, Issue 12, Dec. 2008, pp. 1601-1615.

Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.

(56) References Cited

OTHER PUBLICATIONS pdf>>, IEEE Educational Activities Department, Transactions on Knowledge and Data Engineering, vol. 13, No. 1, Jan. 2001, pp. 96-111.
Kostakos, et al., Urban computing to bridge online and real-world social networks. Handbook of Research on Urban Informatics, 2008, <<http://hci.uma.pt/courses/ubicomp/papers/social/kostakos-08.pdf>>.
Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.
Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.
Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.
Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.
Lakhina, et al., Diagnosing Network-Wide Traffic Anomalies, In Proceedings of the SIGCOMM 2004 Conference, 12 pages, 2004 ACM.
Lavondes, et al., "Geo::PostalAddress~Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.
Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VDLB 2008, vol. 1, Issue 1, 2008, pp. 1081-1094.
Lee, et al., Trajectory Clustering: A Partition-and-group Framework, In Proceedings of the 26th ACM SIGMOD International Conference on Management of Data 2007, pp. 593-604, 2007.
Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.
Lee, et al., Trajectory Outlier Detection: A Partition-and-Detect Framework, In Proceedings of the 26th ACM SIGMOD International Conference on Management of Data, SIGMOD2007, pp. 593-604, 2007.
Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.
Li, et al., "A Connectivity-Based Map Matching Algorithm", AARS, Asian Journal of Geoinformatics, 2005, vol. 5, No. 3, pp. 69-76.
Li, et al., Mining user similarity based on location history. In Proc. ACM GIS 2008, ACM Press: 1-10, <<http://mc.eistar.net/Paper/Mining%20user%20similarity%20based%20on%20location%20history.pdf>>.
Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.
Li, et al., "Traffic Density-Based Discovery of Hot Routes in Road Networks", Springer-Verlag, Advances in Spatial and Temporal Databases, 2007, pp. 441-459.
Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.
Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.
Liao, et al., "Learning and Inferring Transportation Routines", Elsevier, Artificial Intelligence, vol. 171, Issues 5-6, Apr. 2007, pp. 311-331.
Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.
Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.
Lippi, et al., Collective Traffic Forecasting, Proceedings of the European Conference on Machine Learning and Principles and Practice of Knowledge Discovery Database, ECML PKDD 2010, pp. 259-273, 2010.
Liu, et al., Uncovering cabdrivers' behavior patterns from their digital traces, Computers, Environment and Urban Systems, 2010.
Lozano, et al., Spatial-temporal Causal Modeling for Climate Change Attribution, KDD 2009, Paris France, ACM 2009, 10 pages.
Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.
Manning et al., "An Introduction to Information Retrieval", Draft, Cambridge University Press, Apr. 1, 2009, 581 pages, retrieved on Apr. 16, 2010 at <<http://nlp.stanford.edu/IR-book/pdf/irbookonlinereading.pdf>>.
Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.
Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.
McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.
Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.
Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.
Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=GUIDE&CFID=47499709&CFTOKEN=90308932>>, ACM, KDD 2009, 2009, pp. 637-645.
Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.
Morse, Patel, "An Efficient and Accurate Method for Evaluating Time Series Similarity", retrieved on Apr. 15, 2010 at <<http://

(56) References Cited

OTHER PUBLICATIONS www.eecs.umich.edu/db/files/sigmod07timeseries.pdf>>, ACM, Proceedings of Conference on Management of Data, Jun. 11, 2007, pp. 569-580.
Nicholson, "Finding the Shortest Route Between Two Points in a Network", British Computer Society, The Computer Journal, 1966, vol. 9, No. 3, pp. 275-280.
Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.
Office Action for U.S. Appl. No. 12/037,347, mailed on Aug. 17, 2011, Yu Zheng, "System for Logging Life Experiences Using Geographic Cues", 9 pgs.
Office Action for U.S. Appl. No. 12/562,588, mailed on Dec. 8, 2011, Yu Zheng, "Mining Life Pattern Based on Location History", 31 pgs.
Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.
Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.
Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.
Pelekis, et al., Unsupervised Trajectory Sampling, Proceedings of the European Conference on Machine Learning and Principles and Practice of Knowledge Discovery in Databases ECML PKDD 2010, pp. 17-33, 2010.
Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.
Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.
Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages.
Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.
Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.
Ringberg, et al., Sensitivity of PCA for Traffic Anomaly Detection, SIGMETRICS 2007, pp. 109-120.
Rosenfeld, Connectivity in digital pictures. Journal of the ACM (JACM), 17(1):160, 1970.
Rosenfeld, Connectivity in digital pictures, Journal of the ACM 17 (1): pp. 146-160, 1970.
Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.
Saltenis, "Outlier Detection Based on the Distribution of Distances between Data Points", retrieved on Dec. 12, 2008 at <<http://www.mii.it/informatica/pdf/INFO558.pdf>>, INFORMATICA, vol. 15, No. 3, 2004, pp. 399-410.
Salton, et al., "A Vector Space Model for Automatic Indexing", Communications of the ACM, vol. 187, No. 11, Nov. 1975, pp. 613-620.
Salton, "Dynamic Document Processing", Communications of the ACM, vol. 15, Issue 7, Jul. 1972, pp. 658-668.
Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.
Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.
Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.
"Share My Routes", retrieved on Apr. 15, 2010 at <<http://www.sharemyroutes.com/>>, 2010, pp. 1-2.
Shekhar, et al., Unified approach to detecting spatial outliers, University of Helsinki 2007, 27 pages, <<http://www.cs.helsinki.fi/u/leino/opetus/spatial-k07/maksimainen.pdf>>.
Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.
Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.
Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.
Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.
Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.
Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.
Sun, et al., On Local Spatial Outliers, Technical Report No. 549, Jun. 2004, <<http://sydney.edu.au/engineering/it/research/tr/tr549.pdf>>, 9 pages.
Takeuchi et al., "City Voyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.
Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.
Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.
Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjCNG20j6K3s_

(56) References Cited

OTHER PUBLICATIONS

WuY-VhWeDjIPYpgxv1Q>>, IEEE Computer Society, Proceedings of Conference on Data Engineering (ICDE), 2002, pp. 673-684.
Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.
Wang, et al., "Closet+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.
Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.
Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.
Winogard, "Dynamic Cartograms for Navigating Geo-referenced Photographs", available at least as early as Nov. 16, 2007, at <<http://cs.stanford.edu/research/project.php?id=289>>, pp. 2
Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.
Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.
Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.
Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.
Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.
Yan, et al., Discovery of frequent substructures, Wiley-Interscience, 2007, 99-113.
Yan, et al., "Feature-based Similarity Search in Graph Structures", ACM Transactions on Database Systems, vol. V, No. N, Jun. 2006, 36 pages.
Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.
Yuxiang, et al., Detecting Spatio-temporal Outliers in Climate Dataset: A Method Study, IEEE 2005, pp. 760-763.
Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.
Zhang, et al., iBAT: Detecting Anomalous Taxi Trajectories from GPS Traces, Proceedings of UbiComp Sep. 2011, 10 pages.
Zhang, et al., "Mining Non-Redundant High Order Correlations in Binary Data", International Conference on Very Large Data Bases (VLDB), Aukland, NZ, Aug. 23-28, 2008, pp. 1178-1188.
Zhang, et al., Network Anomography, USENIX Association, Internet Measurement Conference 2005, pp. 317-330.
Zhao, et al., "Searching for Interacting Features", Proceedings of the 20th International Joint Conference on Artificial Intelligence, Hyderabad, India, Jan. 6-12, 2007, pp. 1156-1161.
Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.
Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.
Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.
Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.
Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.
Zheng et al., "Joint Learning User's Activities and Profiles from GPS Data", ACM Geographic Information Systems Workshop on Location Based Social Networks (ACM LSBN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.
Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.
Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.
Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.
Zheng, et al., Recommending friends and locations based on individual location history. In ACM Transaction on the Web, 2011, 44 pages, <<http://research.microsoft.com/pubs/122435/RecomFriend-zheng-Published.pdf>>.
Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.
Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.

(56) References Cited

OTHER PUBLICATIONS

Zheng, et al., T-Drive: Driving Directions based on Taxi Trajectories, In Proc. ACM SIGSPATIAL GIS 2010. ACM Press, 2010, 10 pages, <<http://www.cse.unt.edu/~huangyan/6350/paperList/T-Drive.pdf>>.
Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597&CFTOKEN=93582958>>, ACM Proceedings of Conference on Ubiquitous Computing (UbiComp), vol. 344, Sep. 21, 2008, pp. 312-321.
Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.
The European Search Report mailed Nov. 21, 2012 for European Patent Application No. 09714738.3, 9 pages.
Office Action for U.S. Appl. No. 12/353,940, mailed on Nov. 2, 2012, Zheng et al., "Detecting Spatial Outliers in a Location Entity Dataset", 11 pages.
Office Action for U.S. Appl. No. 12/794,538, mailed on Nov. 29, 2011, Zheng et al. "Searching Similar Trajectories by Locations", 10 pages.
Office Action for U.S. Appl. No. 12/567,667, mailed on Dec. 19, 2012, Zheng et al., "Recommending Points of Interests in a Region", 18 pages.
Shekhar et al., "A Unified Approach to Detecting Spatial Outliers", GeoInformatica 7:2, 2003, pp. 139-166.
Shiraishi, "A User-centric Approach for Interactive Visualization and Mapping of Geo-sensor Data", Networked Sensing Systems, 2007, INSS, Fourth International Conference on IEEE, Jun. 1, 2007, pp. 134-137.
Spinellis, "Position-Annotated Photographs: A Geotemporal Web", IEEE Pervasive Computing IEEE Service Center, Los Alamintos, CA, vol. 2, No. 2, Apr. 1, 2003, pp. 72-79.
Sun, "Outlier Detection in High Dimensional, Spatial and Sequential Data Sets", School of Information Technologies, The University of Sydney, Sep. 2006, 118 pages.
Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.
Weng et al., "Design and Implementation of Spatial-temporal Data Model in Vehicle Monitor-System", Proceeding of the 8th International Conference on Geocomputation, Aug. 3, 2005, 8 pages.
Min-qi, et al., "An Algorithm for Spatial Outlier Detection Based on Delaunay Triangulation", In the Proceedings of the 2008 International Conference on Computational Intelligence and Security, 2008, pp. 102-107.
Office Action for U.S. Appl. No. 12/353,940, mailed on Mar. 23, 2012, Yu Zheng, "Detecting Spatial Outliers in a Location Entity Dataset", 6 pgs.
Office Action for U.S. Appl. No. 12/773,771, mailed on Mar. 26, 2012, Yu Zheng, "Collaborative Location and Activity Recommendations", 9 pgs.
Office Action for U.S. Appl. No. 12/711,130, mailed on Mar. 27, 2012, Yu Zheng, "Mining Correlation Between Locations Using Location History", 14 pgs.
Office Action for U.S. Appl. No. 12/567,667, mailed on Jul. 18, 2012, Zheng et al., "Recommending Points of Interests in a Region", 20 pages.
Shekhar, et al., "Data Mining for Selective Visualization of Large Spatial Datasets", In the Proceedings of the 14th IEEE International Conference on Tools with Artificial Intelligence, Nov. 2002, pp. 41-48.
Ye, et al., "Mining Individual Life Pattern Based on Location History," Tenth International Conference on Mobile Data Management: Systems, Services and Middleware, May 18-20, 2009, Taipei, 10 pages.
Zhang, et al., "A Taxonomy Framework for Unsupervised Outlier Detection Techniques for Multi-Type Data Sets" Technical Report TR-CTIT-07-79, Centre for Telematics and Information Technology University of Twente, Enschede, 2007, pp. 1-40.
Office Action for U.S. Appl. No. 12/711,130, mailed on Oct. 4, 2012, Zheng et al., "Mining Correlation Between Locations Using Location History", 15 pages.
Office Action for U.S. Appl. No. 12/712,053, mailed on Aug. 15, 2012, Zheng et al., "Route Computation Based on Route-Oriented Vehicle Trajectories", 17 pages.
Tai et al., "Recommending Personalized Scenic Itinerary with Geo-Tagged Photos", ICME, Jun. 2008, 4 pages.
Domain Name System (DNS), retrieved on Apr. 29, 2008 at <<http://www.unix.org.ua/orelly/networking/firewall/ch08_10.htm>>, Unix, pp. 1-11.
Domain Name System (DNS) A Guide to TCP/IP, retrieved at <<http://web.syr.edu/~djmolta/ist452/ch_07.ppt>>, Thomson Learning Course Technology, pp. 1-56
Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.
Eustice et al, "The Smart Party: A Personalized Location Aware Multimedia Experience", Consumer Communications and Networking Conf, Jan. 2008, 5 pgs.
"Flow Control Platform (FCP) Solutions", at <<http://k2colocation.com/network-services/fcp.cfm>>, K2 Colocation, 2005, pp. 2.
"Global Server Load Balancing for Disaster Recovery, Business Continuity, Performance Optimization and Datacenter Management", at <<http://www.zeus.com/documents/en/ZXT/ZXTM_Global_Load_Balancer.pdf>>, Zeus Technology Limited, 1995-2007, pp. 4.
GPS Sharing, retrieved Feb. 4, 2013 at http://web.archive.org/web/20071129224158/http://gpssharing.com, 2 pgs.
Hariharan et al, "NetTrust—Recommendation System for Embedding Trust in a Virtual Realm", ACM Recommender Systems, Oct. 2007, 6 pgs.
Intl Search Report for PCT/US2009/063023, mailed Jun. 10, 2010, 4 pgs.
Jarvelin et al, "Cumulated Gain Based Evaluation of IR Techniques", ACM Transactions on Information Systems, vol. 20, No. 4, Oct. 2002, 25 pgs.
Jones et al, "P3 Systems: Putting the Place Back into Social Networks", IEEE Internet Computing, Sep.-Oct. 2005, 9 pgs.
Lee et al, "Efficient Mining of User Behaviors by Temporal Mobile Access Patterns", Intl Journal of Computer Science and Network Security, vol. 7, No. 2, Feb. 2007, 7 pgs.
Linden et al, "Amazon.com Recommendations, Item to Item Collaborative Filtering", IEEE Internet Computing, Jan. and Feb. 2003, 5 pgs.
Linden, "The End of Federated Search?", at <<http://glinden.blogspot.com/2007/03/end-of-federated-search.html>>, Mar. 24, 2007, pp. 9.
Matsuo et al, "Inferring Long Term User Properties Based on Users' Location History", Proc 20th Intl Joint Conf on Artificial Intelligence, Jan. 2007, 7 pgs.
McDonald et al, "Expertise Recommender: A Flexible Recommendation System and Architecture", CSCW 2000, Dec. 2000, 10 pgs.
Michael et al, "Location Based Intelligence—Modeling Behavior in Humans Using GPS", Proc Intl Symposium on Technology and Society, Jun. 2006, 8 pgs.
Office Action for U.S. Appl. No. 12/041,599, mailed on Jul. 25, 2011, Arne Josefsberg, "Failover in an Internet Location Coordinate Enhanced Domain Name System".
Office action for U.S. Appl. No. 13/188,013, mailed on Nov. 15, 2011, Josefsberg et al., "Internet Location Coordinate Enhanced Domain Name System", 14 pages.
Office action for U.S. Appl. No. 12/353,940, mailed on Feb. 28, 2013, Zheng et al., "Detecting Spatial Outliers in a Location Entity Dataset", 9 pages.
Office Action for U.S. Appl. No. 12/041,599, mailed on Feb. 9, 2012, Arne Josefsberg, "Failover in an Internet Location Coordinate Enhanced Domain Name System", 27 pgs.
Office action for U.S. Appl. No. 12/041,599, mailed on Sep. 21, 2012, Josefsberg et al., "Failover in an Internet Location Coordinate Enhanced Domain Name System", 9 pages.

(56) References Cited

OTHER PUBLICATIONS

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16.

Sarwar et al, "Application of Dimensionality Reduction in Recommender System, A Case Study", ACM WebKDD Workshop, Aug. 2000, 12 pgs.

Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.

Wikipedia, "Operating System", retrived from <<http://en.wikipedia.org/wiki/Operating_system>> on Oct. 8, 2010, pp. 1-pp. 17.

Xie, "Understanding User Behavior Geospatially", Microsoft Research, Nov. 2008, 2 pgs.

Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.

Ashbrook,et al., "Using GPS to Learn Significant Locations and Predict Movement Across Multiple Users", Journal of Personal and Ubiquitous Computer Archive, vol. 7, Issue 5, Oct. 2003, 15 pages.

Breiman, "Bagging Pedictors", Machine Learning, vol. 24, No. 2, Aug. 1996, pp. 123-140.

Chen, et al., "GeoTracker Geospatial and Temporal RSS Navigation", WWW2007, May 2007, pp. 41-50.

"CRF++: Yet Another CFR Toolkit", retrieved on Jan. 18, 2008 from <<http://crfpp.sourceforge.net>>, 13 pages.

Hadjieleftheriou, et al., "Complex Spatio-Temporal Pattern Queries", Proceedings of the 31st VLDB Conference, Sep. 2005, pp. 877-888.

Hadjieleftheriou, et al., "Efficient Indexing of Spatiotemporal Objects", Proceedings of the 8th International Conference on Extending Database Technology: Advances in Database Technology, Mar. 2002, 10 pages.

Han, et al., "Predicting User' Movement with a Combination of Self-Organizing Map and Markov Model", ICANN 2006, Part II, LNCS 4132, Sep. 2006, pp. 884-893.

International Preliminary Report on Patentability in PCT Application No. PCT/US2009/032777 dated Sep. 10, 2010, 6 pages.

Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.

International Search Report and Written Opinion Received for PCT Application No. PCT/US2009/0327777, mailed Aug. 26, 2009, 10 pages.

International Search Report dated Aug. 19, 2009 for PCT Application No. PCT/US2009,032778, filed Jan. 31, 2009, 11 pages.

Lafferty, et al., "Conditional Random Fields: Probabilistic Models for Segmenting and Labeling Sequence Data", Proceedings of the 18th International Conference on Machine Learning, Jun. 2001, 8 pages.

Mitchell, et al., "Six in the City: Introducing Real Tournament—A Mobile IPv6 Based Context-Aware Multiplayer Game", NetGames'03, May 2003, pp. 91-100.

"North York Moors and Yorkshire Wolds Mountain Bke (MTB) Routes", retrieved on Jan. 17, 2008 from <<http://www.mtb-routs.co.uk/northyorkmorrs/default.aspx>>, 4 pages.

Non-Final Office Action for U.S. Appl. No. 12/041,608, mailed on Jun. 25, 2014, Josefsberg, et al., "Client-Side Management of Domain Name Information", 4 pages.

Office Action for U.S. Appl. No. 12/712,857, mailed on Jun. 6, 2014, Yu Zheng, "Map-Matching for Low-Sampling-Rate GPS Trajectories", 14 pages.

Office action for U.S. Appl. No. 12/712,053, mailed on Jun. 6, 2014, Zheng et al., "Route Computation Based on Route-Oriented Vehicle Trajectories", 24 pages.

Office Action for U.S. Appl. No. 12/353,940, mailed on Jul. 17, 2014, Yu Zheng, "Detecting Spatial Outliers in a Location Entity Dataset", 10 pages.

"SlamXR List Routes Page by Microsoft Research Community Technologies Group", retrieved on Jan. 18, 2008 from <<http://www.msslam.com/slamxr/ListRoutes.aspx>, 2 pages.

"SportsDo", retrieved on Jan. 17, 2008 from <<http://sportsdo.net/Activity/ActivityBlog.aspx>>, 3 pages.

Strachan, et al., "gpsTunes Controlling Navigation via Audio Feedback", Proceedings of MobileHCI, Sep. 2005, 4 pages.

Sui, "Decision Support Systems Based on Knowledge Management", Proceedings of the International Conference on Services Systems and Services Management (ICSSSM'05), Jun. 2005, vol. 2, pp. 1153-1156.

Tezuka, et al., "Toward Tighter Integration of Web Search with a Geographic Information System", WWW2006, May 2006, 10 pages.

Theodoridis, et al., "Spatio-Temporal Indexing for Large Multimedia Applications", Proceedings of the IEEE International Conference on Multimedia Systems, Jun. 1996, 9 pages.

Theodoridis, et al., "Specifications for Efficient Indexing in Spatiotemporal Databases", Proceedings of the SDDBM'98, Jul. 1998, 10 pages.

Toyama, et al., "Geographic Location Tags on Digital Images", MM'03, Nov. 2003, 11 pages.

"Twittervision", retrieved on Jan. 18, 2008 from <<http://twittervision.com>>, 1 page.

Wasinger, et al., "M3I in a Pedestian Navigation & Exploration System", Proceedings of the Fifth International Symposium on Human Computer Interaction with Mobile Devices, Sep. 2003, 5 pages.

Wei, et al., "A Service-Portlet Based Visual Paradigm for Personalized Convergence of Information Resources", 2nd IEEE International Conference on Computer Science and Information Technology, Aug. 2009, pp. 119-124.

"Weka 3: Data Mining Software in Java", retrieved on Jan. 18, 2008 from <<http://www.cs.waikato.ac.nz/ml/weka/index_home.html>>, 1 page.

"Welcome to WalkJogRun", retreived on Jan. 17, 2008 from <<http://www.walkjogrun.net>>, 1 page.

"WikiWalki Community Trail Guide", retrieved on Jan. 17, 2008 from <<http://www.wikiwalki.com>>, 1 page.

Zhang, et al., "Research on Information Fusion on Evaluation of Driver Fatigue", 2008 International Symposium on Computer Scientc and Computational Technology, Dec. 2008, pp. 151-155.

Office action for U.S. Appl. No. 12/712,857, mailed on Aug. 5, 2013, Zheng, et al., "Map-Matching for Low-Sampling-Rate GPS Trajectories", 15 pages.

Final Office Action for U.S. Appl. No. 12/567,667, mailed on Aug. 27, 2014, Yu Zheng, "Recommending Points of Interests in a Region", 7 pages.

Office action for U.S. Appl. No. 12/353,940, mailed on Mar. 4, 2014, Zheng, et al., "Detecting Spatial Outliers in a Location Entity Dataset", 10 pages.

Office action for U.S. Appl. No. 12/794,538, mailed on Apr. 22, 2014, Zheng et al., "Searching Similar Trajectories by Locations", 38 pages.

Office action for U.S. Appl. No. 12/712,857, mailed on Feb. 21, 2014, Zheng, et al., "Map-Matching for Low-Sampling-Rate GPS Trajectories", 15 pages.

Office action for U.S. Appl. No. 12/567,667, mailed on Feb. 25, 2014, Zheng et al., "Recommending Points of Interests in a Region", 31 pages.

Liao, et al. "Learning and inferring transportation routines", Artificial Intelligence, vol. 171, 2007, pp. 311-331.

Office action for U.S. Appl. No. 12/037,347, mailed on Jan. 13, 2014, Zheng, et al., "System for Logging Life Experiences Using Geographic Cues", 8 pages.

Office action for U.S. Appl. No. 12/041,608, mailed on Nov. 22, 2013, Josefsberg, et al., "Client-Side Management of Domain Name Information", 7 pages.

(56) References Cited

OTHER PUBLICATIONS

Office action for U.S. Appl. No. 12/794,538, mailed on Nov. 25, 2013, Zheng, et al., "Searching Similar Trajectories by Locations", 18 pages.
Office action for U.S. Appl. No. 12/794,538, mailed on Sep. 13, 2013, Zheng, et al., "Searching Similar Trajectories by Locations", 12 pages.
Office action for U.S. Appl. No. 12/712,857, mailed on Jan. 6, 2015, Zheng, et al., "Map-Matching for Low-Sampling-Rate GPS Trajectories", 15 pages.
Office action for U.S. Appl. No. 12/712,053, mailed on Mar. 10, 2015, Zheng et al., "Route Computation Based on Route-Oriented Vehicle Trajectories", 22 pages.
Office action for U.S. Appl. No. 12/794,538, mailed on Mar. 23, 2015, Zheng et al., "Searching Similar Trajectories by Locations", 8 pages.
Final Office Action for U.S. Appl. No. 12/712,857, mailed on Oct. 7, 2015, Yu Zheng, "Map-Matching for Low-Sampling-Rate GPS Trajectories", 18 pages.
Office action for U.S. Appl. No. 14/659,125, mailed on Jun. 19, 2015, Inventor #1, "Recommending Points of Interests in a Region", 7 pages.
Office action for U.S. Appl. No. 12/712,857, mailed on Jun. 25, 2015, Inventor #1, "Map-Matching for Low-Sampling-Rate GPS Trajectories", 17 pages.
Office action for U.S. Appl. No. 12/794,538, mailed on Aug. 14, 2015, Zheng et al., "Searching Similar Trajectories by Locations", 10 pages.
Carter, et al., "When Participants Do the Capturing: The Role of Media in Diary Studies," CHI 2005: 899-908, 10 pages.
Chakka, et al., "Indexing Large Trajectory Data Sets With SETI," Proceedings of the 2003 CIDR Conference, pp. 1-12.
Dumas, et al., "Stuff I've Seen: A System for Personal Information Retrieval and Re-Use," SIGIR, Aug. 1, 2003, pp. 1-8.
Freeman, Eric, "Lifestreams: A Storage Model for Personal Data," SIGMOD Record, vol. 25, No. 1, Mar. 1996, pp. 80-86.
Gemmell, et al., "MyLifeBits: A Personal Database for Everything," Microsoft Bay Area Research Center, MSR-TR-2006-23, Feb. 20, 2006, pp. 1-18.
Hadjieleftheriou, et al., "Indexing Spatio-temporal Archives," Proceedings of Extending Database Technology 2002, pp. 1-22.
Klemmer, et al., "Where Do Web Sites Come From? Capturing and Interacting with Design History," CHI, Contextual Displays Paper, Apr. 20-25, 2002, vol. 4, No. 1, pp. 1-8.
Kollios, et al., "Indexing Animated Objects Using Spatiotemporal Access Methods," A TimeCenter Technical Report, TR-54, Jan. 25, 2001, pp. 1-32.
Kumar, et al., "Approximate Minimum Enclosing Balls in High Dimensions Using Core-Sets," Journal of Experimental Algorithmics (JEA), vol. 8, 2003, Artl. No. 1.1, pp. 1-29.
Kumar, et al., "Designing Access Methods for Bitemporal Databases," IEEE Trans. Knowl. Data Eng., 1998, pp. 1-41.
Lou, et al., "Map-Matching for Low-Sampling-Rate GPS Trajectories," ACM GIS '09, ISBM 978-1-60558-649, Nov. 4-6, 2009, pp. 1-10.
Nascimento, et al., "Evaluation of Access Structures for Discretely Moving Points", Proceedings of the International Workshop on Spatio-Temporal Database Management, Sep. 1, 1998, State Univ. of Campinas, Brazil, 18 pp.
Office action for U.S. Appl. No. 12/794,538, mailed on Mar. 2, 2016, Zheng et al., "Searching Similar Trajectories by Locations", 10 pages.
Office action for U.S. Appl. No. 14/587,270, mailed on Apr. 8, 2016, Zheng et al., "Determine Spatiotemporal Causal Interactions in Data", 7 pages.
Papadopoulos et al., "Performance of Nearest Neighbor Queries in R-Trees", In ICDT, 1997, pp. 394-408.
Salzberg et al., "Comparison of Access Methods for Time-Evolving Data", ACM Computing Surveys, 31(2), 1999, pp. 158-221, 64 pages.
Song et al., "Hashing Moving Objects," Proceedings of 2nd International Conference of Mobile Data Management, 2001, pp. 1-31.
Tao et al., "MV3R-Tree: A Spatio-Temporal Access Method for Timestamp and Interval Queries," Proceedings of the International Conference on Very Large Data Bases, 2001, 10 pages.
Theodoridis et al., "On the Generation of Spatiotemporal Datasets," Advances in Spatial Databases, 6th International Symposium, Lecture Notes in Computer Science, Springer, 1999, 19 pages.
Wang et al., "A Flexible Spatio-Temporal Indexing Scheme for Large-Scale GPS Track Retrieval," MDM '08 9th International Conference on Mobile Data Management, IEEE, Beijing, 8 pages.
Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, pp. 21-27, 7 pages.
Yuan et al., "An Interactive-Voting Based Map Matching Algorithm," In IEEE Conference on Mobile Data Management (MDM), 2010, 10 pages.
Agarwal, et al., "Geometric Approximation via Coresets," Combinatorial and Computational Geometry, MSRI Publications, vol. 52, 2005, 30 pages.
Agrawal, et al., "Efficient Similarity Search in Sequent Databases," IBM Almaden Research Center, San Jose, California, 4th International Conference, Oct. 1993, 15 pages.
Blandford, Rafe, "Looking at Lifeblog," retrieved at <<http://www.allaboutsymbian.com/features/item/Looking_at_Lifeblog.php>>, Oct. 18, 2004, 14 pages.
Flickr. http://www.flickr.com/, 1 pages.
Fu, et al., "Heuristic shortest path algorithms for transportation applications: State of the art," Science Direct, Computers & Operations Research 33 (2006) 3324-3343, available May 3, 2005; pp. 3324-3343.
Geek Magazine, "LifeLog: DARPA looking to record lives of interested parties," retrieved at <<http://www.geek.com/news/lifelog-darpa-looking-to-record-lives-of-interested-parties-552879/>>, retrieved on Sep. 23, 2013, published on Jun. 3, 2003, 4 pages.
GeoLife GPS Trajectories, <<http://research.microsoft.com/en-us/downloads/b16d359d-d164-469e-9fd4-daa38f2b2e13/default.aspx.
Hanlon, Mike, "Nokia Lifeblog is an automated multimedia diary," retrieved at <<http://www.gizmag.com/go/2729/>>, Jun. 4, 2004, 5 pages.
International Preliminary Report on Patentability for PCT Application No. PCT/US2009/032774, mailed on Aug. 31, 2010.
International Search Report and the Written Opinion for PCT Application No. PCT/US2009/032778, mailed on Aug. 19, 2009, 11 pgs.
Kim et al., "A Spatiotemporal Data and Indexing," Proceedings of IEEE Region 10 International Conference eon Electrical and Electronic Technology, Singapore, Aug. 19-22, 2001, pp. 110-113.
Kolovson et al., "Segment Indexes: Dynamic Indexing Techniques for Multi-Dimensional Interval Data," Proceedings of the ACM SIGMOD Conference on Management of Data, 1991, pp. 138-147, 10 pages.
Kuechne et al., "New Approaches for Traffic Management in Metropolitan Areas," in 10th IFAC Symposium on Control in Transportation Systems, Aug. 2003, 9 pages.
Mead, Nick, "Lifeblog 2.5," retrieved at <<http://lifeblog.en.softonic.com/symbian>>, Feb. 25, 2008, 2 pages.
Mountain Bike. http://www.mtb-tracks.co.uk/northyorkmoors/default.aspx, retrieved Jan. 18, 2008, 2 pages.
Nascimento et al., "Towards historical R-trees," Proc. of the ACM Symp. on Applied Computing, SAC, pp. 235-240, Feb. 1998, 6 pages.
Notice to File Corrected Application Papers U.S. Appl. No. 12/794,538, mailed on Mar. 11, 2010, Zheng et al. "Mining Correlation Between Locations Using Location History", 2 pages.
Office Action for U.S. Appl. No. 13/195,496, mailed on Oct. 21, 2011, Yu Zheng, "Learning Transportation Modes from Raw GPS Data", 7 pages.
Office Action for U.S. Appl. No. 12/037,263, mailed on Oct. 8, 2010, Longhao Wang, "Indexing Large-Scale GPS Tracks", 7 pages.

(56) References Cited

OTHER PUBLICATIONS

Office Action for U.S. Appl. No. 13/195,496, mailed on Feb. 7, 2012, Yu Zheng, "Learning Transportation Modes from Raw GPS Data", 7 pages.
Office Action for U.S. Appl. No. 12/037,347, mailed on Mar. 1, 2011, Zheng, et al., System for Logging Life Experiences Using Geographic Cues, 18 pages.
Office Action for U.S. Appl. No. 12/037,263, mailed on Mar. 29, 2011, Longhao Wang, "Indexing Large-Scale GPS Tracks", 8 pages.
Office Action for U.S. Appl. No. 12/712,857, mailed on May 20, 2016, Yu Zheng, "Map-Matching for Low-Sampling-Rate GPS Trajectories", 14 pages.
Office Action for U.S. Appl. No. 13/324,758, mailed on Jul. 13, 2016, Zheng et al., "Urban Computing of Route-Oriented Vehicles", 7 pages.
Office action for U.S. Appl. No. 12/794,538, mailed on Aug. 2, 2016, Zheng et al. "Searching Similar Trajectories by Locations", 7 pages.
International Preliminary Report on Patentability for PCT Application No. PCT/US2009/032778, mailed on Aug. 31, 2011.
Office Action for EP Patent Application No. 09 715 263.1, mailed on Feb. 16, 2015, "Learning Transportation Modes from Raw GPS Data", 5 pages.
Office Action mailed Oct. 9, 2015 for European Patent Application No. 09 715 263.1.
Rao et al., "Making B+-tree Cache Sensitive in Main Memory," Proceedings of ACM SIGMOD Conference, 2000, pp. 475-486, 12 pages.
Shachtman, Noah, "A Spy Machine of DARPA's Dreams," retrieved at <<http://archive.wired.com/techbiz/media/news/2003/05/58909?currentPage=all>>, Wired, May 20, 2003, 1 page.
Shachtman, Noah, "Pentagon Kills Lifelog Project," retrieved at <<http://www.wired.com/2004/02/pentagon-kills-lifelog-project/>>, Wired, Feb. 4, 2004, 6 pages.
Song et al., "SEB-tree: An Approach to Index Continuously Moving Objects," Proceedings of International Conference of Mobile Data Management, pp. 340-344, Jan. 2003.
Supplemental EP Search Report App. No. 09713700.4 mailed Jul. 17, 2012, 9 pages.
Weeks, Darren, "LifeLog: Because Big Brother Cares What You're Thinking," retrieved at <<http://www.sweetliberty.org/issues/privacy/lifelog.htm>> on Dec. 3, 2005, Big Brother, 5 pages.
Wikipedia, "DARPA LifeLog," retrieved at <<https://en.wikipedia.org/wiki/DARPA_LifeLog>>, Dec. 14, 2013, 1 page.
Wikipedia, "Nokia Lifeblog," retrieved at <<https://en.wikipedia.org/wiki/Nokia_Lifeblog>>, on Feb. 26, 2008, 2 pages.
Xu et al., "RT-Tree: An Improved R-Tree Indexing Structure for Temporal Spatial Databases," Proc. of the Intl. Symp. on Spatial Data Handling, SDH, pp. 1040-1049, Jul. 1990, 5 pages.

Zheng, et al., "Collaborative Location and Activity Recommendations with GPS History Data," Proceedings of the 19th International Conference on World Wide Web, 2010, pp. 1029-1038.
Zheng et al., "Cross-domain Activity Recognition," In Proc. of the 11th International Conference on Ubiquitous Computing (Orlando, USA, 2009), ACM Press, pp. 61-70.
Zheng et al., "Understanding Transportation Modes Based on GPS Data for Web Applications," ACM Transactions on the Web, 4(1):1-36, 2010.
Zhou et al., "Close Pair Queries in Moving Object Databases," Proceedings of ACM GIS, pp. 2-11, 2005, 10 pages.
Office Action for U.S. Appl. No. 15/134,523, mailed Nov. 4, 2016, Zheng et al., "Recommending Points of Interests in a Region", 12 pages.
The European Office Action mailed Feb. 21, 2017 for European Patent Application No. 09714738.3, a counterpart foreign application of U.S. Pat. No. 8,972,177, 7 pages.
Office Action for U.S. Appl. No. 15/134,523, mailed Feb. 15, 2017, Zheng et al., "Recommending Points of Interests in a Region", 12 pages.
Office action for U.S. Appl. No. 12/712,857, mailed on Mar. 3, 2017, Zheng, et al., "Map-Matching for Low Sampling-Rate GPS Trajectories", 7 pages.
Takeuchi et al., "An Outdoor Recommendation System Based on User Location History", Proceedings of the 1st International Workshop on Personalized Context Modeling and Management for UbiComp Applications (ubiPCMM 2005), Tokyo, Japan Sep. 11, 2005, pp. 91-100, retrieved on Apr. 16, 2010 at <<http://docs.goole.com/viewer?a=v&q=cache:YIN-In6ZcXMJ:citeseerx.ist.psu.edu/viewdoc/download%3Fdoi%3D10.1.1.91.813%26rep%3drep1%26type%3Dpdf+An+outdoor+recommendation+system+based+on+user+location+history&hl=en&gl=in&pidd=bl&srcid=ADGEESgYbZnkev0rbu0INm3j8a4HXHilCtHgEvxWdua4tDaQFPVEwnMtX6y9N07NvOHOpzSoBNxis8In6fadaZvXyb_XtuTwWhzNcCayvDXpqoGP7QaJCStspRLn830NkWVy7_R-i9&sig=AHIEtbQTIEOI3XHfa1KJtRr29GNt3stWpA==.
Yi, Jagadish, Faloutsous, "Efficient Retrieval of Similar Time Sequences under Time Warping", IEEE Computer Society, Presentation: Proceedings of Conference on Data Engineering (ICDE), 1998, pp. 1-15, retrieved on Apr. 15, 2010 at <<http://www.google.co.in/url?sa=t&source=web&ct=res&cd=3&ved=0CBYQFjAC&url=http%3A%2F%2Fciteseerx.ist.psu.edu%2Fviewdoc%2Fdownload%3Fdoi%3D10.1.1.105.6211%26rep%3Drep1%26type%3Dpdf&rct=j&q=Efficient+retrieval+of+similar+time+sequences+under+time+warping&ei=4ffGS5ShA4_0_Aalk5z8DA&usg=AFQjCNEkCq5vQwgb6OQfZmT_RWcgMZ2YNA>>.
Office Action for U.S. Appl. No. 15/134,523, dated Apr. 6, 2017, Zheng et al., "Recommending Points of Interests in a Region", 15 pages.

* cited by examiner

US 9,754,226 B2

URBAN COMPUTING OF ROUTE-ORIENTED VEHICLES

BACKGROUND

Ubiquitous computing is a model of human-computer interaction to integrate information processing into daily activities. For instance, ubiquitous computing includes multiple computational devices and systems operating simultaneously. Recently, ubiquitous computing is applied to urban areas, which includes physical movements and interpretations of social context. As a result, urban computing is emerging as a concept where every sensor, person, vehicle, building, and street in the urban areas may be used as a computing component for serving people and their towns or their cities.

Urban computing may be used for urban planning that integrates land-use planning and transportation planning to improve built, economic, and social environments of communities. Urbanization is increasing at a fast pace in developing countries. Meanwhile, urban reconstruction, renewal, and suburbanization are occurring in countries that have already been developed. However, there are opportunities for innovative technologies that may automatically and inconspicuously sense urban dynamics and provide crucial information to urban planners.

For instance, a large number of taxicabs transport passengers in urban areas. Some taxicabs may be equipped with sensors to record their location data to a centralized server at regular intervals. The taxicabs may be considered to be ubiquitous mobile sensors constantly probing the urban areas' traffic patterns. Thus, there is an increasing opportunity to utilize the location data of route-oriented vehicles.

SUMMARY

This disclosure describes analyzing effectiveness of an urban area based on traffic patterns collected from logs of route-oriented vehicles. In one aspect, a process collects sequences of global positioning system (GPS) points in the logs and identifies geographical locations to represent the urban area where the route-oriented vehicles traveled based on the logs. The process models traffic patterns in the urban area by: partitioning the urban area into regions based at least in part on major roads, segmenting the GPS points from the logs into time slots, and identifying the GPS points associated with transporting a passenger in the route-oriented vehicles. The process further models traffic patterns by projecting the identified GPS points onto the regions to construct transitions of the identified GPS points travelling between the regions. Then the process builds a matrix of the regions for each time slot in each day based on a number of the transitions. Each item in the matrix represents an effectiveness of connectivity between the regions.

In another aspect, an interface receives user input for an urban area to be evaluated for an efficiency of the planning of the urban area. An area computing application receives sequences of global positioning system (GPS) points from logs of route-oriented vehicles and creates a model of the traffic patterns in the urban area being selected based on the GPS points. The model identifies pairs of regions in the urban area having a set of transitions between them when travelling in the regions. The area computing application aggregates the transitions to associate each pair of regions with a volume of traffic between the pair of regions, expected travel speeds of the transitions, and a ratio between an actual travel distance and an Euclidan distance between centroids of each of the pair of regions. An identified pair of regions may require the route-oriented vehicles to take detours based on congested traffic when travelling between the identified pair of regions. Based on this evaluation, recommendations may be provided for converting streets to one way streets, adding more lanes to the streets, adding more roads, adding another subway line, adding a bus stop, adding a train stop, building a shopping area, and the like.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes evaluating effectiveness of an urban area based on information collected from the logs of the route-oriented vehicles. The route-oriented vehicles travel frequently in the urban area to pick up passengers and to drop the passengers off in their desired destinations. Typically, a majority of the route-oriented vehicles tend to be equipped with sensors, such as global positioning system (GPS) sensors, which enable the route-oriented vehicles to report their locations to a centralized server at regular intervals. For instance, the sensors may collect the GPS points at regular intervals, such as every one to two minutes, every two to five minutes, or may be set at shorter or longer intervals.

As a result, the route-oriented vehicles equipped with the sensors are constantly probing the urban areas' traffic patterns, such as traffic flow on the roads and city-wide travel patterns of people in the route-oriented vehicles. For instance, a large city may have approximately 67,000 route-oriented vehicles generating an average of 1.2 million trips per day with passengers in the route-oriented vehicles. The 1.2 million trips per day generated by the route-oriented vehicles tend to have an average of 1.2 passengers per trip. This number represents about 5% of total personal trips created by various transportation systems including buses, subways, private vehicles, and the route-oriented vehicles. Based on the 5% of total personal trips, the route-oriented vehicles represent actual traffic patterns on the roads in the urban area. As a result, a process may create a model to model traffic patterns and to connect the traffic flows between the regions in the urban area.

Traffic data is collected via the GPS sensors in logs of the route-oriented vehicles. A process extracts trajectories, which are sequences of GPS points from the logs. The trajectories represent trips for the route-oriented vehicles and imply human knowledge from drivers of the route-oriented vehicles. For example, human knowledge may include driving conditions during rush hour, road constructions, direction turns, and the like.

While aspects of described techniques can be implemented in any number of different computing systems, environments, and/or configurations, implementations are described in the context of the following example computing environment.

ILLUSTRATIVE ENVIRONMENT

Figure 1:
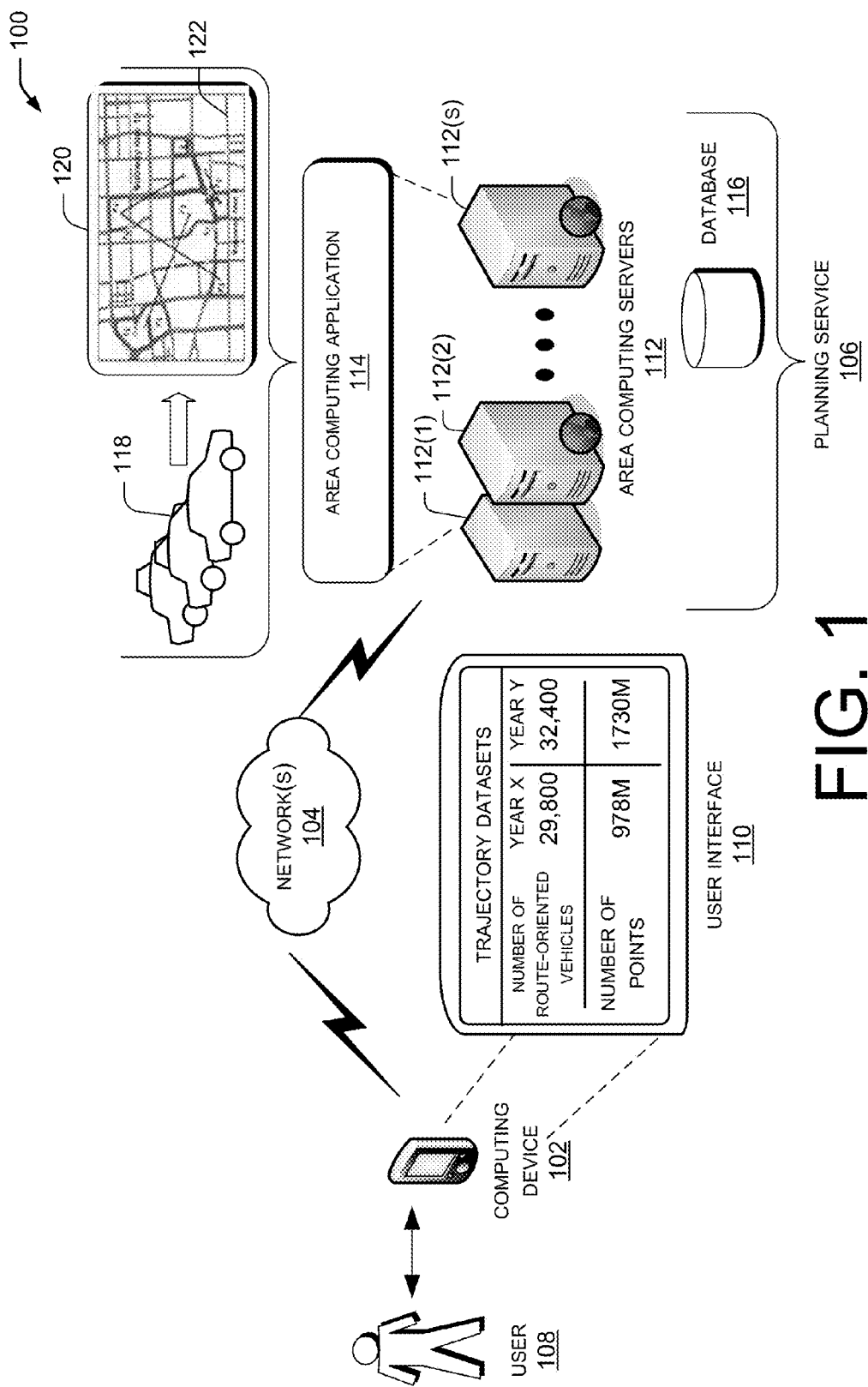
FIG. 1 illustrates an architecture to support an example environment to evaluate an effectiveness of planning of an urban area.

FIG. 1 illustrates an example architectural environment 100, in which an evaluation of an effectiveness of planning of an urban area may be determined on a computing device. The environment 100 includes an example computing device 102, which is illustrated as a mobile device. The computing device 102 is configured to connect via one or more network(s) 104 to access a planning service 106 for a user 108. It is noted that the computing device 102 may take a variety of forms, including, but not limited to, a portable handheld computing device (e.g., a personal digital assistant, a smart phone, a cellular phone), a personal navigation device, a laptop computer, a desktop computer, a portable media player, or any other device capable of connecting to one or more network(s) 104 to access the planning service 106 for the user 108.

The network(s) 104 represents any type of communications network(s), including wire-based networks (e.g., cable), wireless networks (e.g., cellular, satellite), cellular telecommunications network(s), WiFi networks, and IP-based telecommunications network(s). The planning service 106 represents an urban planning service that may be operated as part of any number of online service providers, such as a search engine. In another implementation, the planning service 106 may be a map-based application stored in memory of the computing device 102. Updates with GPS logs and trajectories may be sent for an area computing application that is stored on a mobile device.

In the illustrated example, the computing device 102 may include a user interface (UI) 110 that is presented on a display of the computing device 102. The user interface 110 facilitates access to the planning service 106 that provides the evaluation of the planning of urban area(s). The user 108 also employs the UI 110 to submit a request for an urban area from the planning service 106.

In one implementation, the UI 110 is a browser-based UI that presents a page received from the trajectory datasets of the route-oriented vehicles. The UI 110 shows trajectory datasets for "Year X" and "Year Y." The UI 110 illustrates the datasets are collected from about 29,800 route-oriented vehicles in Year X and from about 32,400 route-oriented vehicles in Year Y. The UI 100 also illustrates the number of GPS points is approximately 978 million in Year X and approximately 1730 million in Year Y.

In the illustrated example, the planning service 106 is hosted on one or more area computing servers, such as area computing server(s) 112(1), 112(2), . . . , 112(S), accessible via the network(s) 104. The area computing servers 112(1)-(S) may be configured as plural independent servers, or as a collection of servers that are configured to perform larger scale functions accessible by the network(s) 104. The area computing server(s) 112 may be administered or hosted by a network service provider that provides the planning service 106 to and from the computing device 102.

The planning service 106 further includes an area computing application 114 that executes on one or more of the area computing servers 112(1)-(S). The area computing application 114 provides the evaluation of the effectiveness of the urban area, which first includes collecting logs from the route-oriented vehicles. Data from the route-oriented vehicles are used as drivers are very familiar with urban roads and time-variant traffic flows on the urban roads. The drivers know the fastest routes, which are short and quick, but not necessarily the shortest in distance. Thus, the data of the route-oriented vehicles enhances the area computing application 114 by mining human knowledge, such as learning smart driving directions.

The area computing application 114 processes the global positioning system (GPS) logs from various types of route-oriented vehicles. Based on the logs collected, the area computing application 114 identifies geographical locations where the route-oriented vehicles have traveled to generate a map of the urban area. To better identify effective driving directions in the geographical locations, the area computing application 114 parses trajectories from the logs. The urban area may be further partitioned into multiple regions based at least on the major roads.

The trajectory datasets may be stored in a database 116, which is then used to construct a model based at least in part on the traffic patterns of the route-oriented vehicles. The model involves associating each route-oriented vehicle trajectory to a corresponding region in the urban area. Details of constructing the model are described with reference to FIGS. 4-8.

As mentioned, the environment 100 may include the database 116, which may be a separate server or may be a representative set of server 112 that is accessible via the network(s) 104. The database 116 may store information, such as logs for one or more route-oriented vehicle(s) 118, a sequence of global positioning system (GPS) points, trajectories archive, graphs, a matrix, models, other data, and the like.

The environment 100 shows a representation of the urban area 120 computed as a result of the GPS logs from the route-oriented vehicles 118. The representation of the urban area 120 illustrates evaluations and recommendations performed by the area computing application 114 to the user 108. For instance, at 122 is a recommendation for a subway line to decrease the traffic.

Figure 2:
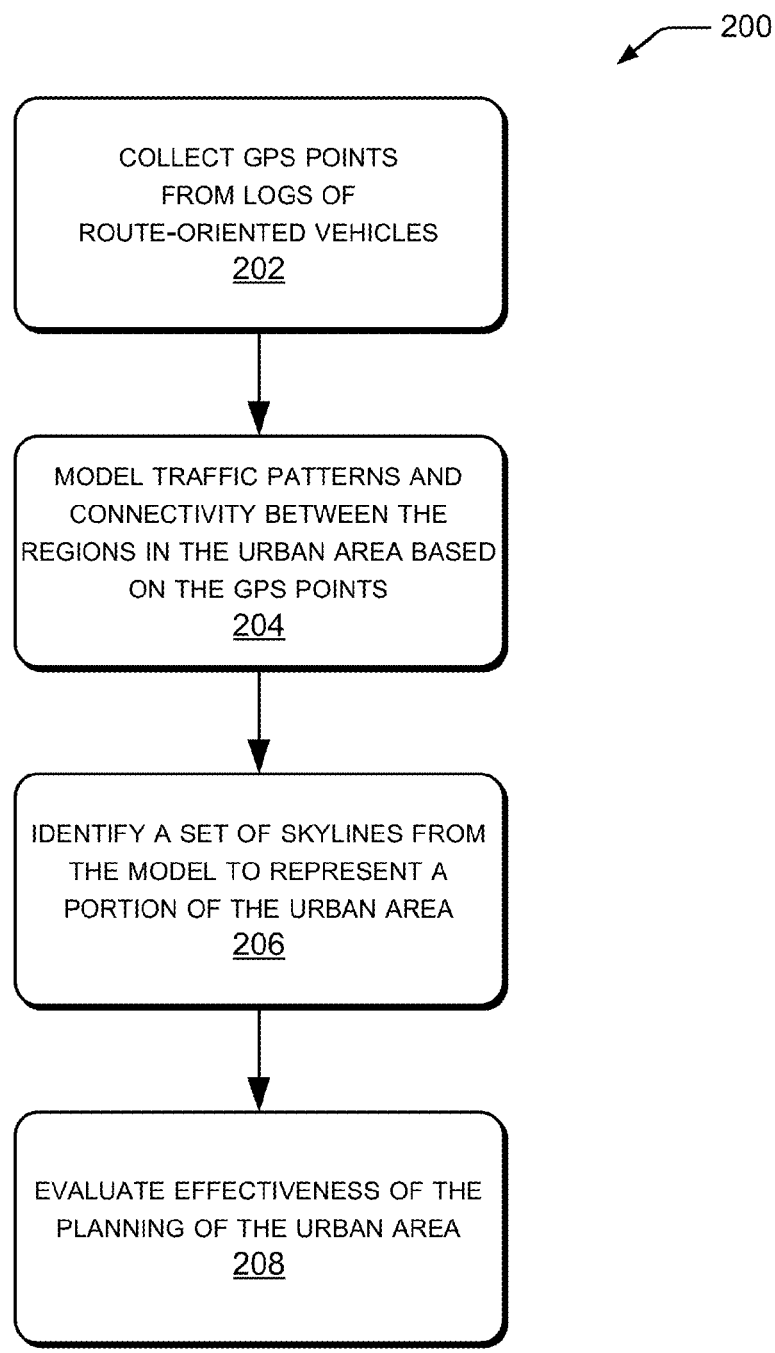
FIG. 2 is a flowchart showing example phases to: collect GPS points, model traffic patterns between the regions, identify a set of skylines from a model, and evaluate effectiveness of the planning of the urban area to be used in the architecture of FIG. 1.

FIG. 2 is a flowchart of an example process 200 showing high-level functions performed by the area computing application 114. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

The area computing application 114 provides the evaluation of the urban area based on the log information collected from the route-oriented vehicles 118. The process 200 may be divided into four phases, an initial phase to collect GPS points from logs of route-oriented vehicles 202, a second phase to model traffic patterns and connectivity between the regions in the urban area based on the GPS points 204, a third phase to identify a set of skylines from the model to represent a portion of the urban area 206, and a fourth phase to evaluate the effectiveness of planning of the urban area 208. All of the phases may be used in the environment of FIG. 1, may be performed separately or in combination, and without any particular order.

The first phase is to collect the GPS points from the logs of the route-oriented vehicles 202. For instance, the area computing application 114 collects the logs from various types of route-oriented vehicles 118 that transport passengers, including but not limited to taxicabs, limousines, and shuttles. These types of route-oriented vehicles 118 tend to focus on picking up and dropping off passengers in the urban area. The logs may be obtained from GPS sensors located on each of the route-oriented vehicles 118. The logs are generally a collection of GPS points, which includes a date, a time, a longitude coordinate, and a latitude coordinate. Also, the GPS points associated with transporting passengers are selected for the evaluation, so the route-oriented vehicles 118 may include a weight sensor for each of the route-oriented vehicles 118 to detect passengers other than the driver, a weight sensor to determine an occupancy status in a passenger seat of the route-oriented vehicle 118, an identifier for the driver to specify a passenger is present in the route-oriented vehicle 118, and the like. From the logs, the geographical locations are identified in the urban area.

The second phase is to model traffic patterns and connectivity between the regions in the urban area based on the GPS points 204. For example, the area computing application 114 models the traffic patterns by: partitioning the urban area into regions based at least in part on major roads, segmenting the GPS points from the logs into time slots, and identifying the GPS points associated with transporting a passenger in the route-oriented vehicles 118. The area computing application 114 projects the GPS points onto the regions to identify pairs of regions having a set of transitions between them when travelling in the regions and builds a matrix for the regions.

The third phase is to identify a set of skylines from the model to represent a portion of the urban area 206. The term skyline describes a graphical representation of the data. For instance, the set of skylines represents the GPS points with travel speeds and ratios of actual travel distance and an Euclidan distance between centroids of each of the pair of regions, which are less efficient than other GPS points. The area computing application 114 then identifies pairs of regions having small travel speeds and large ratios of actual travel distance and the Euclidan distance between centroids of each of the pair of regions. The identified pairs of regions may require the route-oriented vehicles 118 to take detours based on congested traffic when travelling between the identified pairs of regions.

The fourth phase is to evaluate the effectiveness of planning of the urban area 208. Based on this evaluation, the area computing application 114 may provide recommendations for building new roads, converting streets to one way streets, adding more lanes to existing roads, adding new roads, adding another subway line, adding a bus stop, adding a train stop, and the like. Details are discussed for collecting GPS points from logs of the route-oriented vehicles 202 with reference to FIG. 3; for modeling traffic patterns 204 with reference to FIGS. 4-8, for creating and mining skylines with reference to FIGS. 9-12, and for evaluating the effectiveness of planning of the urban area with reference to FIG. 13.

Collect GPS Points from Logs of Route-Oriented Vehicles

Figure 3:
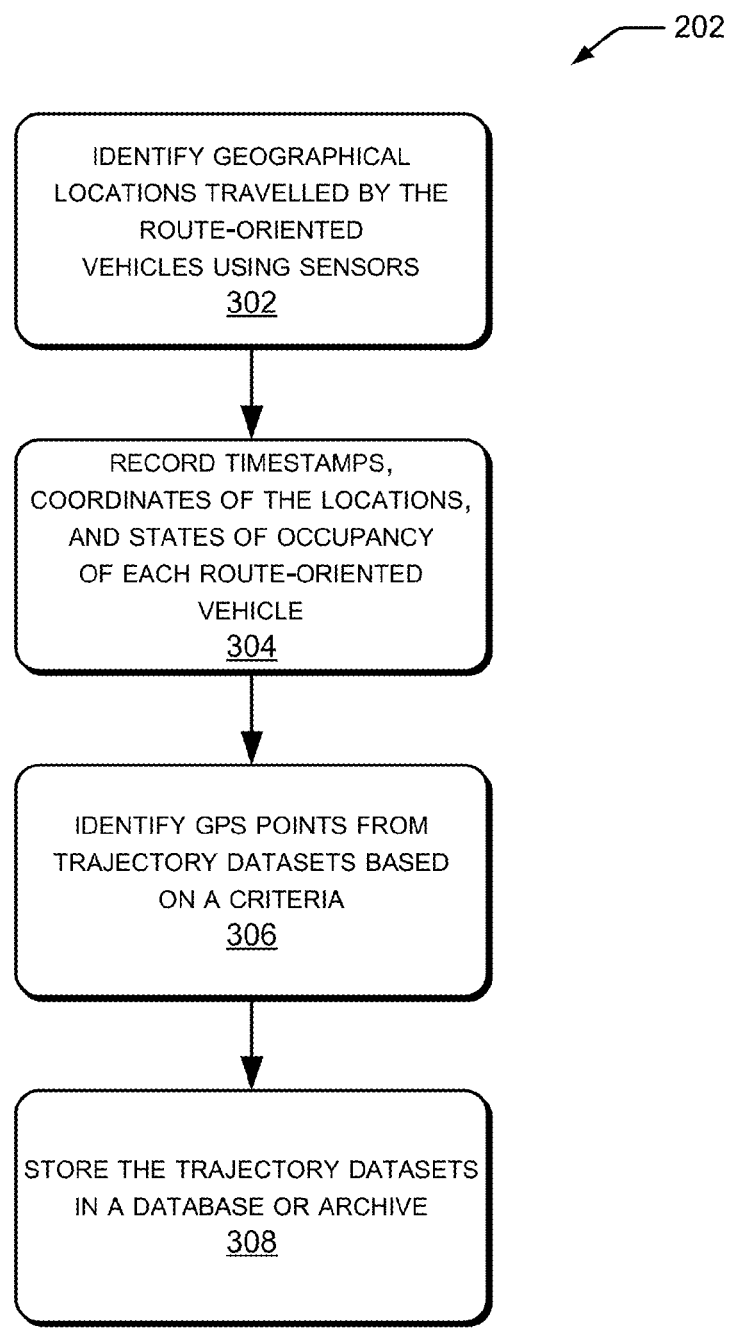
FIG. 3 is a flowchart showing an example process of collecting the GPS points from the logs of the route-oriented vehicles.

FIG. 3 is a flowchart illustrating an example process for phase 202 (discussed at a high level above) of collecting the GPS points from the logs of the route-oriented vehicles 118. The area computing application 114 may use the collected GPS logs from the centralized server or receive the GPS logs from the route-oriented vehicle companies. Drivers for the route-oriented vehicles 118 may be very familiar with the roads and time-variant traffic flows on the roads. To be effective and to make profit, the drivers for the route-oriented vehicles 118 tend to select a fastest route based on their knowledge. Along with their knowledge, the drivers consider other factors, such as traffic flows and signals, accidents, road constructions, direction turns, and the like. By directly following their routes that are well supported by the GPS logs, the knowledge of the drivers may be effectively used.

The area computing application 114 identifies the geographical locations from the logs to represent the urban area 302. The geographical locations from the logs represent roads and streets where the route-oriented vehicles 118 have traveled as recorded in the logs.

It is possible to collect log information since a large number of the route-oriented vehicles 118 may be equipped with GPS sensors that automatically record a trajectory, which is a sequence of time-ordered GPS points. The trajectory may be represented by Tr. Each trajectory may include the sequence of GPS points represented as $p_1 \rightarrow p_2 \rightarrow p_3 \rightarrow \ldots \rightarrow p_n$.

At 304, the GPS sensors record timestamps, coordinates of locations, and status of occupancy of each route-oriented vehicle 118 for a GPS point. The status of occupancy may be determined by a weight sensor for each of the route-oriented vehicles 118 to detect passengers other than the driver, a weight sensor on seats to determine if passengers occupied the seats of the route-oriented vehicles 118, an identifier of occupancy associated with fares indicating passenger(s) are present in the route-oriented vehicle 118, and the like. For instance, the GPS point may contain a date, a time in a.m. or p.m., a longitude coordinate, a latitude coordinate, and the status of occupancy which may be collected with a low sampling rate every one-two minutes or every two-five minutes per point. Thus, the GPS point may be represented by p=(d, t, long, lat, o).

At 306, the area computing application 114 may identify the GPS points from the trajectory datasets based on satisfying a criteria. For instance, the criteria may include certain dates in the year, specific times during rush hour, weekdays, and an occupied status indicating a passenger was being transported in the route-oriented vehicle 118. In another implementation, the criteria may include summer months, specific times during rush hour, weekends, and the occupied status of the passenger in the route-oriented vehicles.

After the GPS points for the route-oriented vehicle logs have been collected, the area computing application 114 may store the trajectory datasets in the database 116 or archive the information 308. The area computing application 114 uses the GPS points to create a model.

Model Traffic Patterns and Connectivity Between Regions Based on GPS Points

Figure 4:
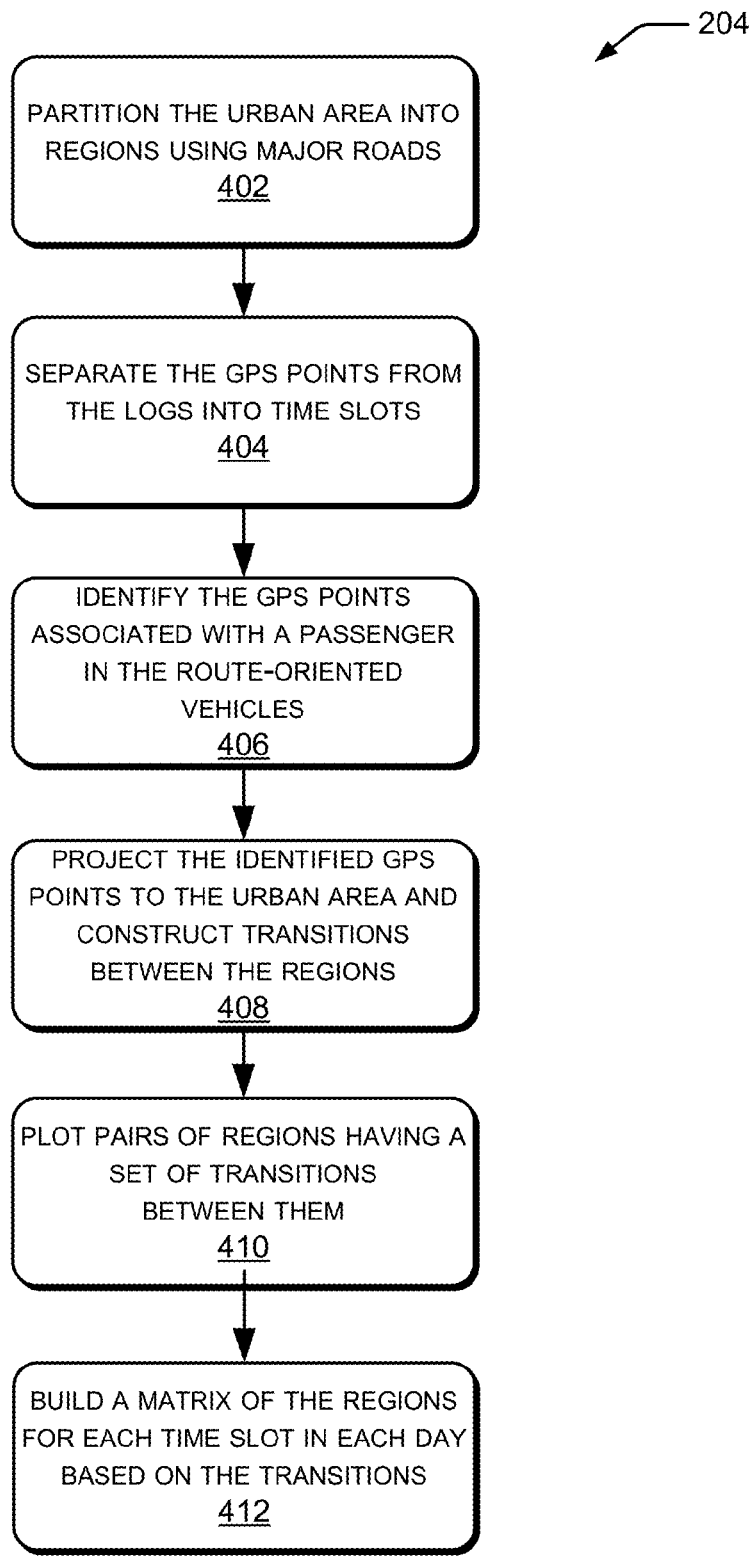
FIG. 4 is a flowchart showing an example process of modeling traffic patterns and connectivity between the regions in the urban area based on the GPS points.

FIG. 4 is a flowchart illustrating an example process for phase 204 (discussed at a high level above) of modeling traffic patterns and connectivity between the regions in the urban area based on the GPS points. The area computing application 114 partitions the urban area into regions represented by (r) based at least on using major roads 402. The use of regions helps provide rich knowledge about people's living and travel conditions. Also any problems or flaws in the regions are reflected in both land-use and transportation planning. An example of partitioning the urban area will be discussed with reference to FIG. 5.

The area computing application 114 may separate the GPS points from the logs into time slots 404. For instance, the area computing application 114 separates the GPS points into two groups, 1) weekdays and 2) weekends and/or holidays. Then the GPS points are further divided according to the time of day into time slots. It is commonly understood that the time of day for travelling on the roads may affect the speed of the route-oriented vehicles 118. Traffic patterns are considerably different during rush hour on weekdays as compared to weekends. For example, the time of day may be grouped into three or four time slots that are different for weekends than weekends or holidays, as shown below.

TABLE I

Time Partition for Weekdays and Weekends/Holidays

| Time | Weekdays | Weekends/Holidays |
|---|---|---|
| Slot 1 | 7:00 am-10:30 am | 9:00 am-12:30 pm |
| Slot 2 | 10:30 am-4:00 pm | 12:30 pm-7:30 pm |

TABLE I-continued

Time Partition for Weekdays and Weekends/Holidays

| Time | Weekdays | Weekends/Holidays |
|---|---|---|
| Slot 3 | 4:00 pm-7:30 pm | 7:30 pm-9:00 am |
| Slot 4 | 7:30 pm-7:00 am | |

The area computing application 114 identifies the GPS points associated with the passenger in the route-oriented vehicles 406. When there are passengers associated with the GPS points, the trajectories represent actual trips along the roads and streets to desired destinations. Thus, this represents actual traffic congestion.

The area computing application 114 projects the identified GPS points to the urban area and constructs transitions between the regions 408. A transition represented by (s) is generated between two regions if a GPS point represented as $p_i$ is a first point in region 1, $r_1$, and $p_j$ is a second point in region 2 $r_2$ (i<j). The transition (s) includes a departure time ($p_i$, $t_i$), an arrival time ($p_j$, $t_j$), a travel distance (d) and a travel speed (v). The travel distance (d) may be calculated with the following equation:

$$d(p_i,p_j) = \Sigma_{i \leq k < j} \text{Dist}(p_k, p_{k+1})$$

where Dist($p_k$, $p_{k+1}$) denotes the Euclidian distance between two consecutive GPS points.

The travel speed (v) may be calculated with the following equation:

$$v = d(p_i,p_j) / |p_j \cdot t - p_i \cdot t|$$

where t represents time. Examples of charts illustrating the speeds of the route-oriented vehicles 118 in certain hours of the day follow with reference to FIGS. 6A and 6B. Examples of the transitions constructed are shown in FIG. 7.

The area computing application 114 plots pairs of regions having a set of transitions between them 410. For instance, the pairs of regions, region 1 and region 2, may be represented by $r_1 \rightarrow r_2$ having the set of transitions between them. The area computing application 114 aggregates the transitions so each pair of regions is associated with the following features: (a) volume of traffic between the regions such as a count of transitions |S|, (b) expected travel speed(s) E(V) of the transitions, and (c) the ratio Θ between the expected actual travel distance E(D) and the Euclidian distance between the centroids of two regions, represented as CenDist($r_1$, $r_2$).

Figure 8:
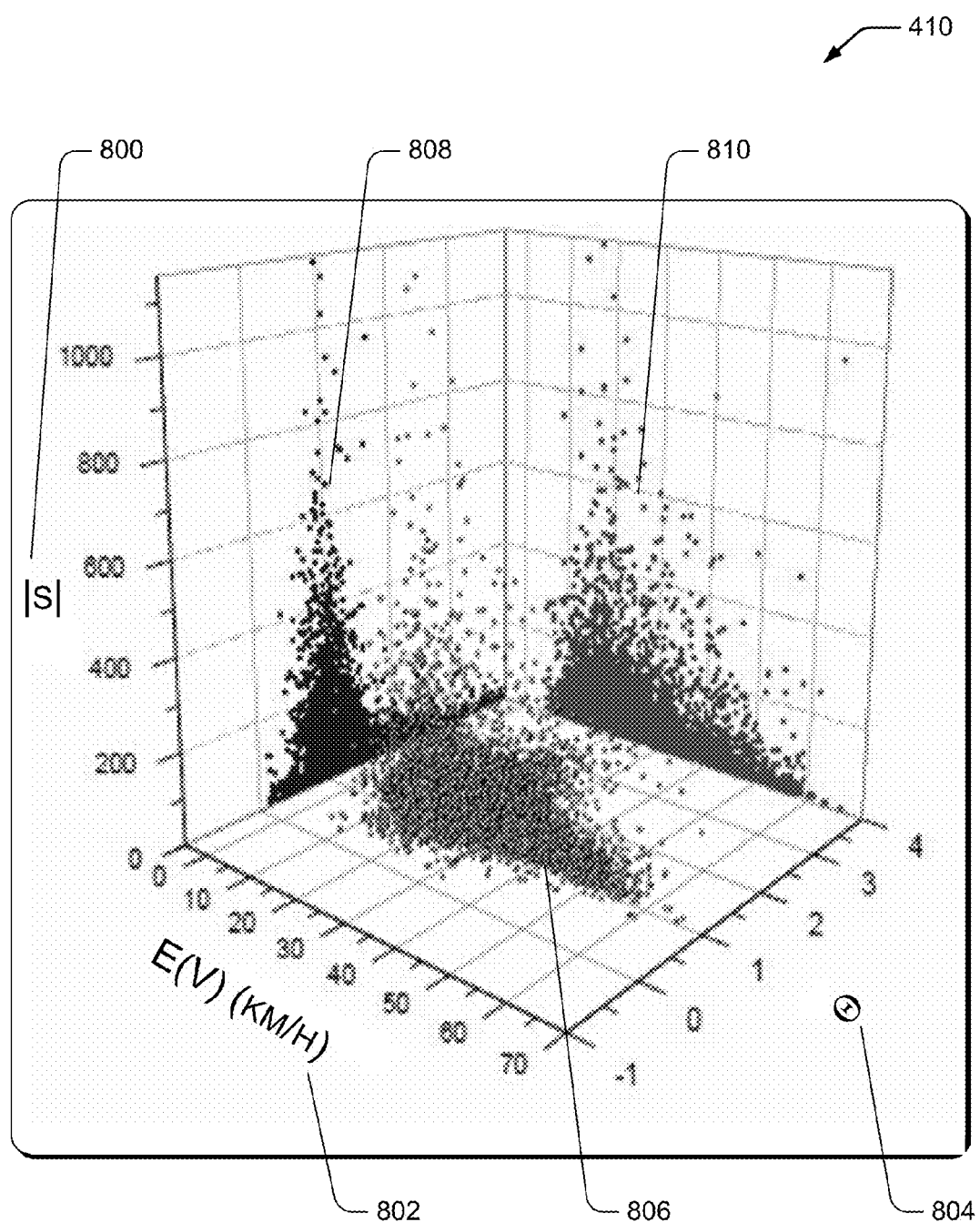
FIG. 8 illustrates an example graph of pairs of regions having a set of transitions between them.

The following equations are used to compute expected travel speed E(V), expected travel distance E(D), and ratio Θ, respectively.

$$E(V) = \frac{\sum_{s_i \in s} s_i \cdot v}{|s|}$$

$$E(D) = \frac{\sum_{s_j \in s} s_j \cdot d}{|s|}$$

$$\theta = E(D) / CenDist(r_1, r_2)$$

where S is a collection of transitions between $r_1$ and $r_2$. An example graph illustrating expected travel speed E(V), expected actual travel distance E(D), and ratio Θ is shown in FIG. 8.

The area computing application 114 builds a matrix of the regions for each time slot in each day based on the transitions 412. For instance, an item in the matrix is a tuple, $a_{i,j}=<|S|, E(V), \Theta>$, denoting a number of transitions $|S|$, the expectation of travel speed $E(V)$, and the ratio $\Theta$ between regions $r_i$ and $r_j$. In an implementation, there may be x weekdays and y weekends or holidays, 4x+3y matrices will be build using the schema of the time slots shown in Table I. The matrix M is shown below.

$$M = \begin{array}{c} \\ r_0 \\ r_1 \\ \vdots \\ r_i \\ \vdots \\ r_{n-1} \\ r_n \end{array} \begin{array}{c} r_0 \quad r_1 \quad \ldots \quad r_j \quad \ldots \quad r_{n-1} \quad r_n \\ \left[ \begin{array}{ccccccc} \emptyset & a_{0,1} & \ldots & \ldots & \ldots & \ldots & a_{0,n} \\ a_{1,0} & \emptyset & \ldots & \ldots & \ldots & \ldots & a_{1n} \\ \ldots & \ldots & \ldots & \ldots & \ldots & \ldots & \ldots \\ a_{i,0} & a_{i,1} & \ldots & a_{i,j} & \ldots & \ldots & a_{i,n} \\ \ldots & \ldots & \ldots & \ldots & \ldots & \ldots & \ldots \\ a_{1,n} & \ldots & \ldots & \ldots & \ldots & \emptyset & a_{n-1,n} \\ a_{n,0} & \ldots & \ldots & \ldots & \ldots & \ldots & \emptyset \end{array} \right] \end{array}$$

Example Map of Partitioned Urban Area into Regions

Figure 5:
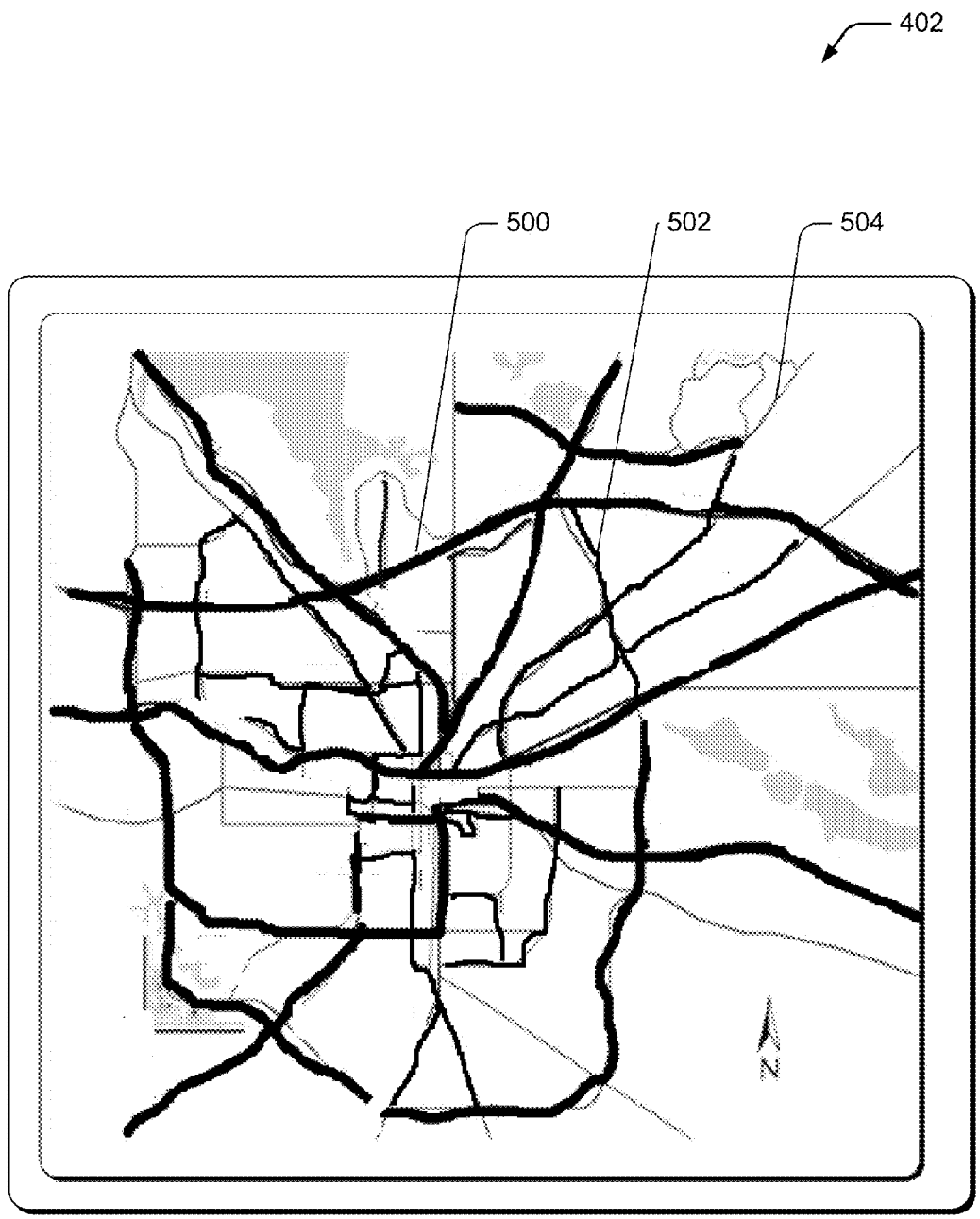
FIG. 5 illustrates an example map of partitioning the urban area into regions based at least on using major roads.

FIG. 5 illustrates an example map of partitioning the urban area into regions based at least on using major roads 402. For instance, a map of the urban area may be divided into disjoint regions, which includes: communities, neighborhoods, subdivisions, roads, streets, and the like. The roads facilitate transportation while the streets facilitate public interaction. The roads include but are not limited to highways and motorways. The streets include but are not limited to pedestrian streets, alleys, city-centre streets, and the like.

In implementations, the major roads 500 may be highlighted with a color or a heavy weight line, and referred to as a first zone that includes the top two communities. Meanwhile, the small roads 502 may be highlighted with another color or a medium weight line, and referred to a second zone that includes smaller areas, which are at a lower level than the first zone. Also, the streets 504 may be highlighted with yet another color or a small weight line, referred to as a third zone that includes smallest areas, and at a lower level than the first zone and the second zone.

Example Charts of GPS Points with Speed Versus Time of Day

Figure 6A:
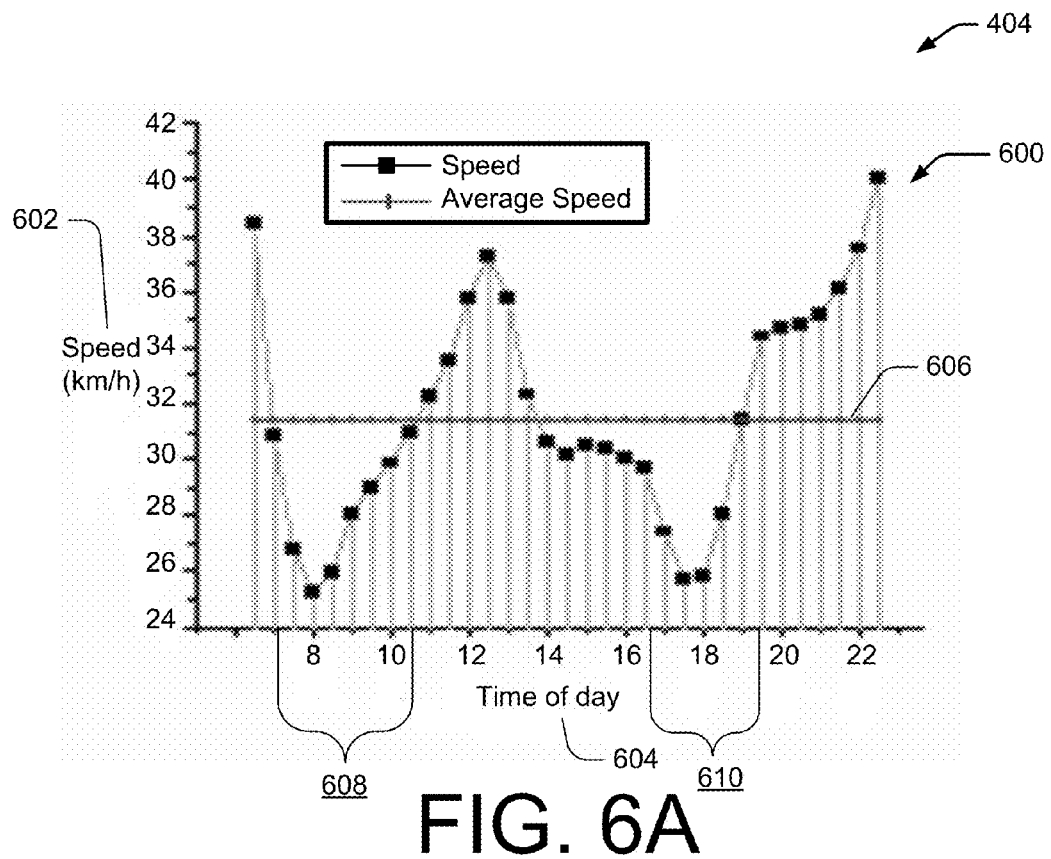
FIGS. 6A and 6B illustrate example charts of segmenting the GPS points into time slots for weekdays and weekends/holidays, respectively with their speeds.
Figure 6B:
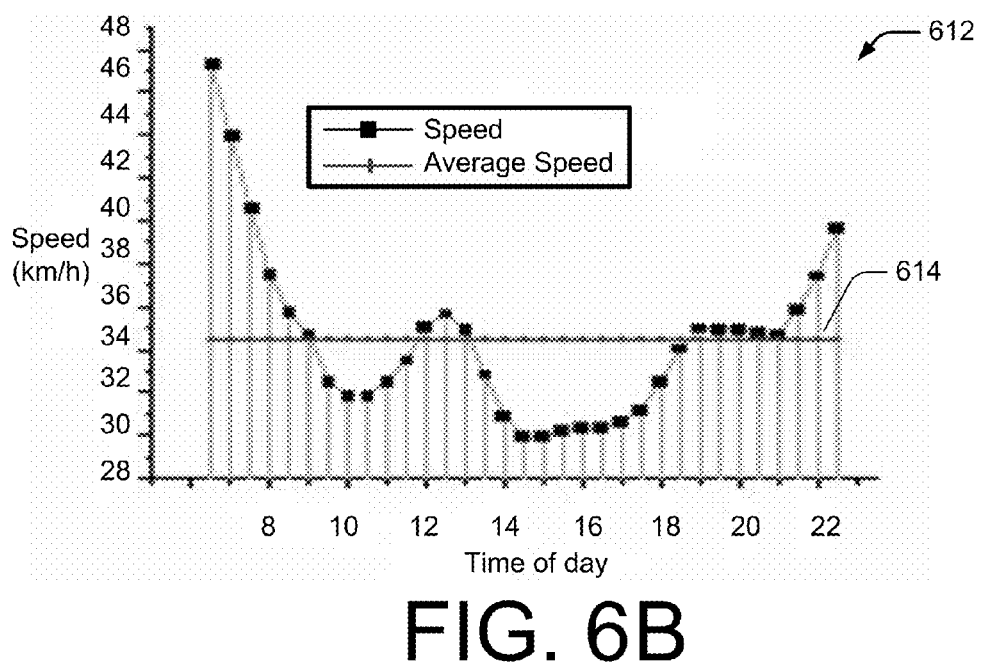
Figure 7:
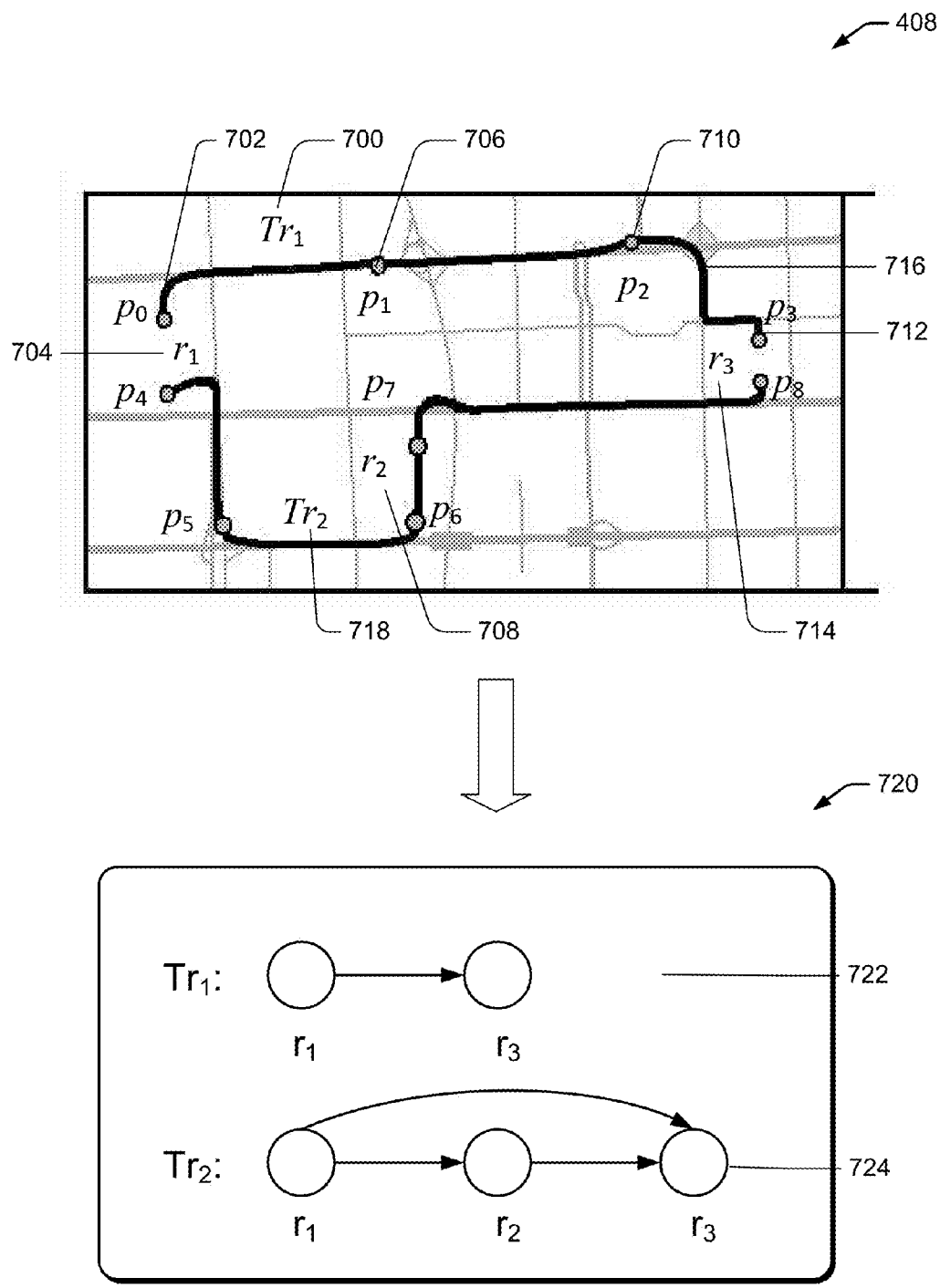
FIG. 7 illustrates an example process of projecting the GPS points onto the regions and constructing transitions between the regions.

FIGS. 6A and 6B illustrate example charts of separating the GPS points from the logs into time slots 404 for weekdays and weekends/holidays, respectively with their speeds. At 600, the chart is for the GPS points collected during the weekdays. The speed 602 of the route-oriented vehicles 118 is shown in (km/h) and the time of day 604 is shown in hour-half increments starting with the hour at 06:00 until 22:30.

The average travel speed is shown at 606. The average travel speed for the route-oriented vehicles 118 in chart 600, from 7:00 am-10:30 am 608 (i.e., slot 1) is lower than that of the entire day. This is expected due to rush hour traffic as there are more vehicles on the roads during this time. Also, the average travel speed during 4:00 pm-7:30 pm 610 (i.e., slot 3) represents the evening rush hour when people are returning home.

The bottom chart 612 illustrates the speed of the route-oriented vehicles 118 and the time of day for weekends or holidays. For instance, the average travel speed is shown at 614. As expected, the average travel speed for the weekdays is slightly slower than the average travel speed for the weekends or holidays.

The charts 600, 612 illustrate in the same time slot, the traffic conditions and semantic meaning of people's travels are similar. The area computing application 114 explores the trajectories from different time slots to detect flaws in the urban planning. Finally, the time partition enables the area computing application 114 to evaluate temporal relationships between the results detected from continuous time slots to understand the flaws in the urban planning.

Construct Transitions Between Regions

FIG. 7 illustrates an example process of projecting the GPS points onto the regions and constructing transitions between the regions 408. The trajectory $Tr_1$ 700 traverses from point $p_0$ 702 in region $r_1$ 704, to $p_1$ 706 in region $r_1$ 704, to $p_2$ 710 in region $r_1$ 704, and to $p_3$ 712 in region $r_3$ 714. The top dark line represents a path 716 of the trajectory $Tr_1$ 700. Also shown is a second trajectory $Tr_2$ 718.

Turning to the diagram 720 below, the two trajectories $Tr_1$ 700 and $Tr_2$ 718 are shown with transitions formed between the regions. The first trajectory $Tr_1$ 700 traverses from $r_1 \rightarrow r_3$ 722 to formulate a transition of $r_1 \rightarrow r_3$. The second trajectory $Tr_2$ 718 traverses from $r_1 \rightarrow r_2 \rightarrow r_3$ 724 to formulate three transitions of: $r_1 \rightarrow r_2$, $r_2 \rightarrow r_3$, and $r_1 \rightarrow r_3$. The second trajectory $Tr_2$ 718 discontinuously traverses two regions, $r_1 \rightarrow r_3$ but formulates the transition between the two regions. Thus, the distance represented by (d) of this transition may be represented by: $\Sigma_{4 \leq k < 8} DiSt(p_k, p_{k+1})$ and the travel speed may be represented by $d/(p_8 \cdot t - p_4 \cdot t)$.

FIG. 8 illustrates pairs of regions having a set of transitions between them 410. An example graph includes a count of transitions $|S|$ 800 on z-axis, the expectation of travel speed $E(V)$ 802 on y-axis, and the ratio $\Theta$ 804 on x-axis. The area computing application 114 plots pairs of regions from a time slot of 7:00 am-10:30 am for a weekday in the $<|S|, E(V), \Theta>$ space. A single dot located in the center 806 represents a pair of regions. The pair of regions is projected onto XZ space 808 and YZ space 810. It is noted that $\Theta$ may have a value smaller than 1 as the route-oriented vehicles travel across two adjacent regions with a distance shorter than that between the two centroids.

Referring to the second trajectory $Tr_2$ 718 that was described in FIG. 7, the route-oriented vehicle 118 may have traveled through several other regions before finally reaching the destination of $r_3$. However, the connectivity of the two regions may be represented by all the possible routes between them instead of the direct or fastest transitions. Often, the driver of the route-oriented vehicle 118 may have to reach a region through a roundabout route travelling through other regions to avoid traffic jams. Also, the discontinuous transitions do not bias the expected travel speed $E(V)$ 802 and the ratio $\Theta$ 804. The drivers of the route-oriented vehicles 118 tend to travel through an effective shortcut route between two regions rather than the roundabout route.

For instance, the driver of the route-oriented vehicle 118 intending to travel from $r_1$ to $r_3$, tends to travel the shortcut route by travelling the trajectory path 716. Thus, the number of discontinuous travel is a very small portion in the transition set. As a result, the expected travel speed $E(V)$ 802 and the ratio $\Theta$ 804 are close to the real travel speed and ratio that people could travel from $r_1$ to $r_3$. However, if the drivers of the route-oriented vehicles 118 have to reach the destination of $r_3$ by travelling through additional regions such as $r_2$, which is indicative that the route directly connecting $r_1$ to $r_3$ is not very effective.

The graph of $<|S|, E(V), \Theta>$ represents the model of traffic patterns and the connectivity between two regions. Specifically, the ratio $\Theta$ 804 captures a geometry property of the connection between the pairs of regions. The pair or regions with a large ratio Θ 804 indicates drivers of the route-oriented vehicles 118 have to take a long detour when travelling from one region to another region. The count of transitions |S| 800 and the expected travel speed E(V) 802 represent features of the traffic. For instance, a large count of transitions |S| 800 and a small expected travel speed E(V) 802 imply there is congested traffic by the existing routes between the two regions. One of the purposes is to identify problem areas in the urban area. The area computing application 114 retrieves the pairs of regions with a large count of transitions |S| 800, a small expected travel speed E(V) 802, and a large ratio Θ 804, which is indicative of flaws in the urban area.

Identify a Set of Skylines from the Model

Figure 9:
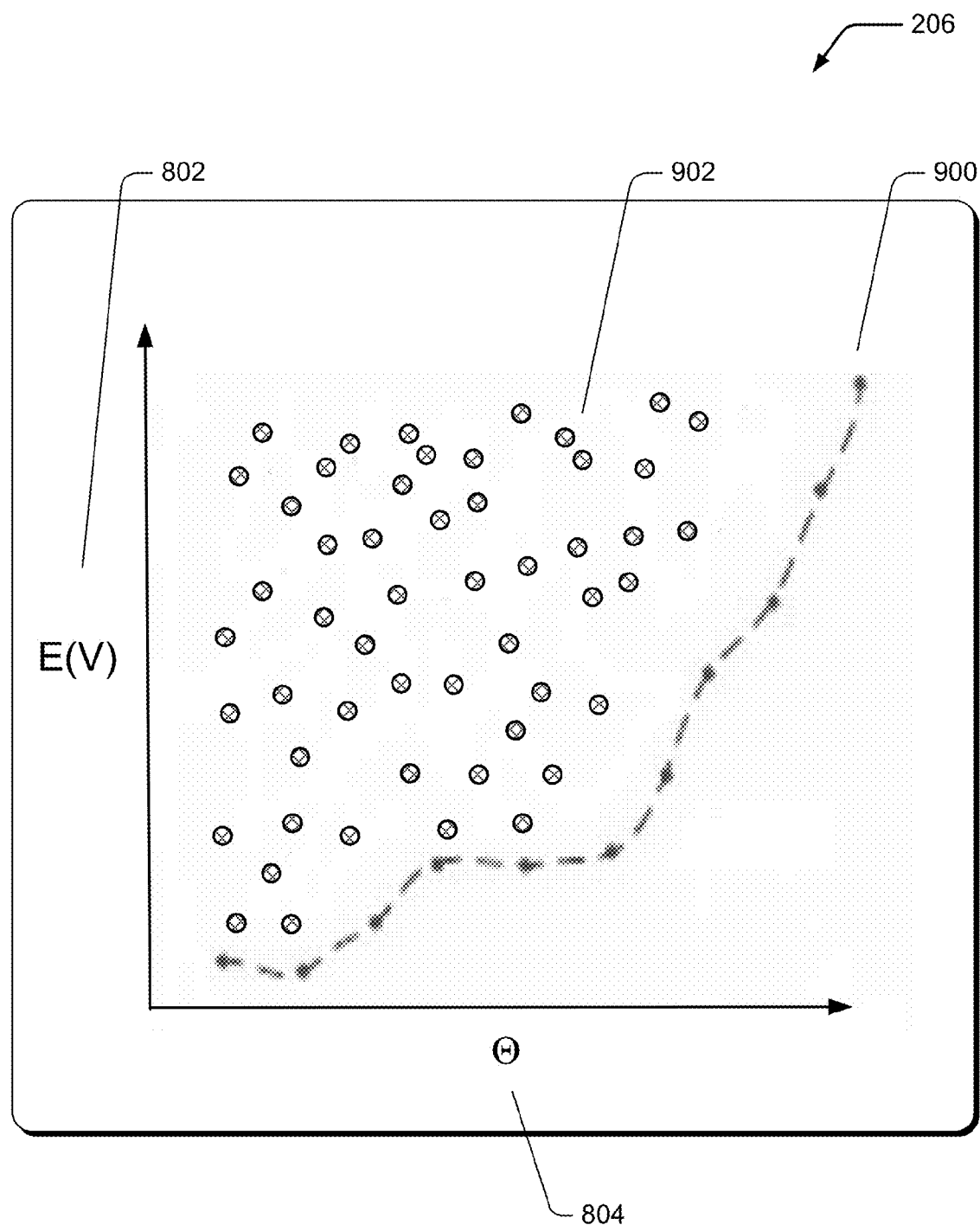
FIG. 9 illustrates an example graph of a set of skylines from the model to represent a portion of the urban area.

FIG. 9 illustrates an example graph from a third phase 206 (discussed at high level above) to identify a set of skylines from the model to represent a portion of the urban area. As previously mentioned, the area computing application 114 built a matrix of regions, M and now selects the pairs of regions having the number of transitions above an average from the matrix M. The area computing application 114 locates "a skyline set" represented by (L) from the selected region pairs according to the expected travel speed E(V) 802 and the ratio Θ 804. A skyline is defined as points which are not dominated by any other points. For instance, a point dominates another point if the point is as good or better in all dimensions and better in at least one dimension than the another point.

An example process illustrates how the area computing application 114 determines when a first point dominates a second point if the first point is as good or better in all dimensions and better in at least one dimension than the second point. Points are shown in Table II along with expected travel speed E(V), and ratio Θ between the actual travel distance and the Euclidan distance between centroids of each of the pair of regions.

TABLE II

Identifying GPS Points for Skyline

| Point | Expected Travel Speed E(V) | Ratio Θ |
|---|---|---|
| 1 | 24 | 1.6 |
| 2 | 20 | 2.4 |
| 3 | 30 | 2.8 |
| 4 | 22 | 2.0 |
| 5 | 18 | 1.4 |
| 6 | 34 | 2.4 |
| 7 | 30 | 2.0 |
| 8 | 36 | 3.2 |

Table II indicates that point 2 dominates point 1 based on the lower E(V) value and higher ratio. Thus, point 1 is not included in the skyline. However, point 2 does not dominate point 3 as point 3 has a higher ratio, indicating point 3 is better than point 2. Also, points 5 and 8 are detected as not being dominated by other points and included in the skyline while points 4, 6, and 7 are dominated by other points.

FIG. 9 further illustrates the expected travel speed E(V) 802 plotted along y-axis and the ratio Θ 804 plotted along x-axis. The dashed line 900 illustrates points representing the pair of regions 900 that have smaller expected travel speeds E(V) 802 and larger ratios Θ 804 than the other points 902 located in the skyline. Each tuple $a_{i,j}$, ∈L is not dominated by others, such as $a_{p,q}$ ∈L∧M, in terms of the expected travel speed E(V) 802 and the ratio Θ 804. There are not any pairs of regions $a_{p,q}$ ∈L having smaller expected travel speed E(V) 802 and larger ratio Θ 804 than $a_{i,j}$ ∈L.

Figure 10:
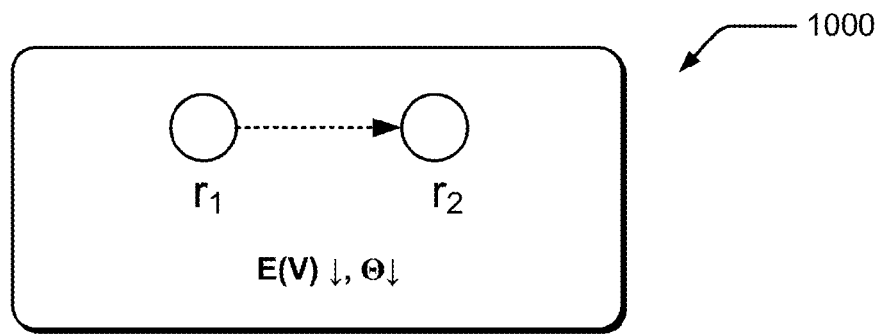
FIG. 10 illustrates example kinds of pairs of regions in the set of skylines.
Figure 10:
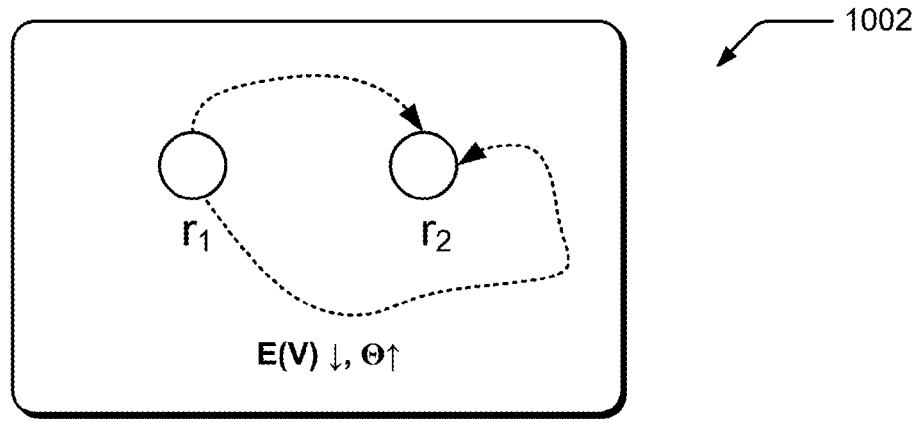
Figure 10:
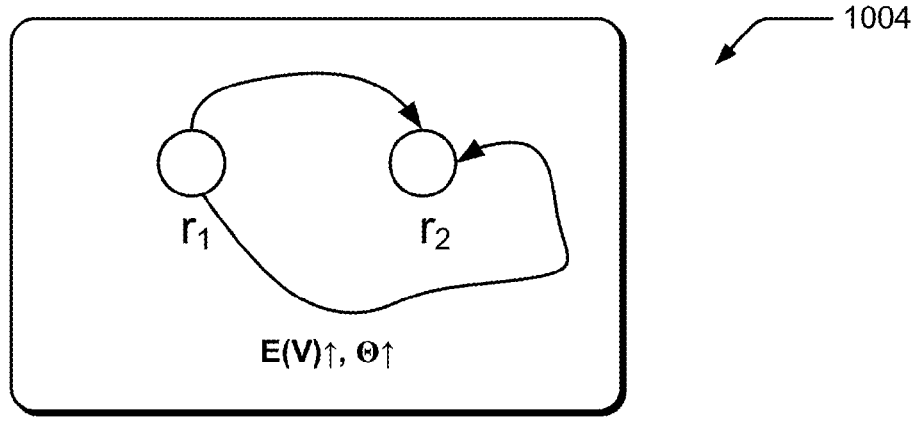

FIG. 10 illustrates example kinds of pairs of regions detected in the set of skylines. For instance, at 1000, the pairs of regions in the set of skylines may have properties of a small expected travel speed E(V) 802 between a set of transitions and a small ratio Θ 804 between an actual travel distance of the set of transitions and an Euclidan distance between centroids of each of the pair of regions. The properties here indicate the pairs of regions are connected with some direct routes, while a capacity of these routes is not sufficient as compared to the existing traffic between the two regions. The properties here further indicate the drivers may have no other options but to take ineffective routes for travelling between the two regions.

In another instance at 1002, the pairs of regions in the set of skylines may have properties of a small expected travel speed E(V) 802 between a set of transitions and a large ratio Θ 804 between an actual travel distance of the set of transitions and an Euclidan distance between centroids of each of the pair of regions. The properties here indicate drivers of the route oriented vehicles 118 have to take detours for travelling between two regions while these detours have congested traffic leading to a slow speed. This is one of the worst cases of the kinds of pairs of regions in the set of skylines.

In yet another instance at 1004, the pairs of regions in the set of skylines may have properties of a large expected travel speed E(V) 802 between a set of transitions and a large ratio Θ 804 between an actual travel distance of the set of transitions and an Euclidan distance between centroids of each of the pair of regions. The properties here indicate that the drivers of the route-oriented vehicles 118 take detours such as highways, which are fast when travelling between two regions. Although the expected travel speed E(V) 802 is not slow, the long distance may cost the drivers and current passengers in the route-oriented vehicles more time and gas.

The area computing application 114 identifies the most salient pairs of regions that have flawed planning. The skyline is constructed from the pairs of regions having a large amount of traffic, as represented by the count of transitions |S| 800 that is above average. Thus, the skyline generated is based on many travels of passengers and each expected travel speed E(V) 802, ratio Θ 804 is calculated based on a large number of observations.

Figure 11:
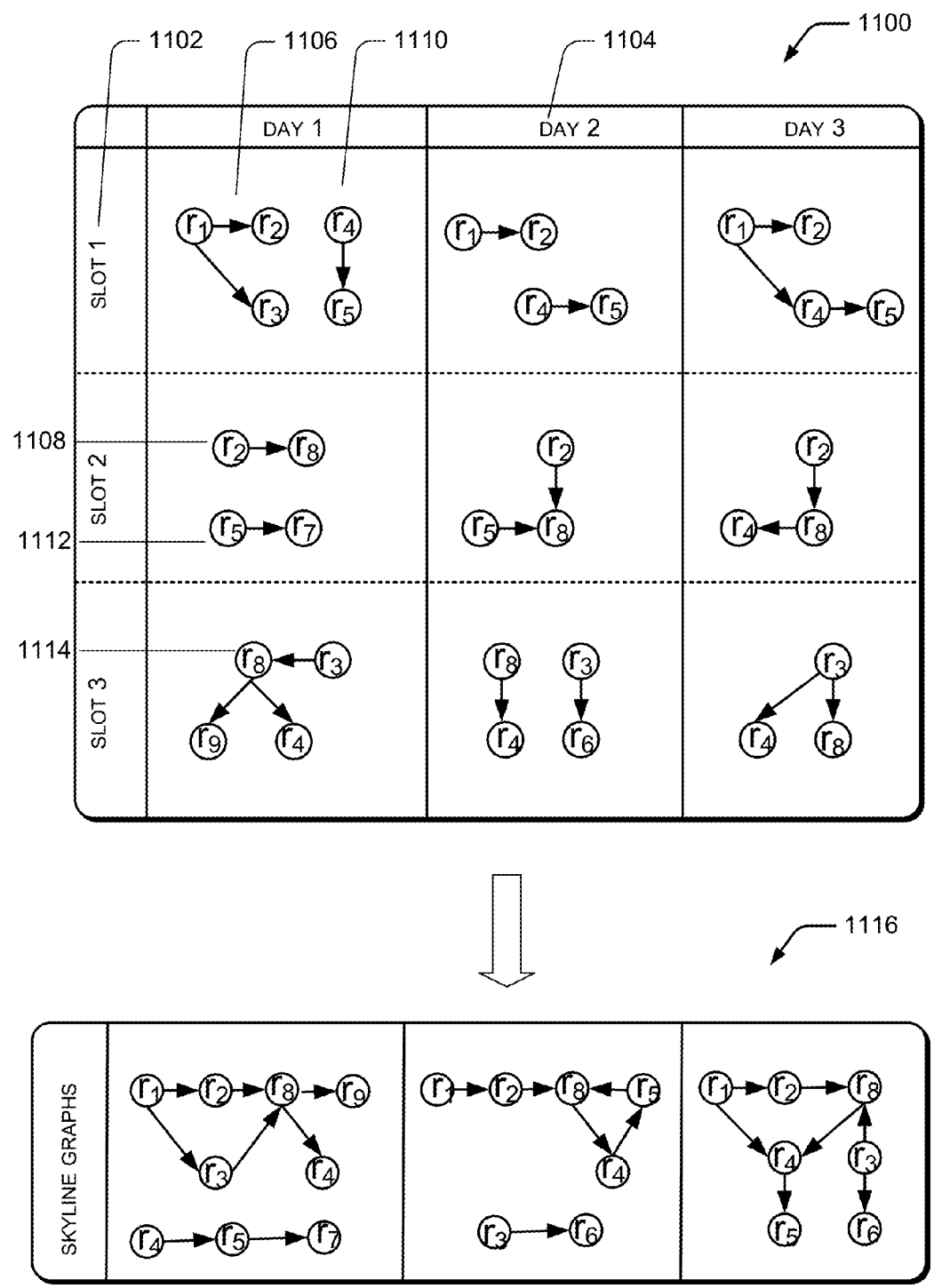
FIG. 11 illustrates an example process of formulating skyline graphs based on the pairs of regions connected from consecutive time slots.

FIG. 11 illustrates an example process 1100 of formulating skyline graphs based on the pairs of regions connected from consecutive time slots. Shown along the left side are time periods of slot 1, slot 2, and slot 3 at 1102. Table I. previously illustrated how the time slots correspond to different hours based on whether the day is a weekday or a weekend or holiday. Shown along the top are days, DAY 1, DAY 2, DAY 3 at 1104.

The process 1100 identifies a skyline in each time slot 1102 of each day 1104. For instance, two pairs or regions from two consecutive slots may be connected if the pairs of regions are spatially close to each other. For example, in DAY 1, the process 1100 connects the pairs of regions $r_1 \rightarrow r_2$ from slot 1 at 1106 to $r_2 \rightarrow r_8$ from slot 2 at 1108 since the two pairs of regions share a common node of $r_2$ and appear in the consecutive time slots of the same day. Also, for DAY 1, the process 1100 connects $r_4 \rightarrow r_5$ from slot 1 at 1110 to $r_5 \rightarrow r_7$ from slot 2 at 1112. However, for DAY 1, the process 1100 does not connect $r_4 \rightarrow r_5$ from slot 1 at 1100 to $r_8 \rightarrow r_4$ from slot 3 at 1114 since the pairs of regions are not temporally close. The process 1100 then formulates a collection of skyline graphs (CG) 1116.

The area computing application 114 mines frequent sub-graph patterns from the collection of skyline graphs across a certain number of days to avoid any false alter. In certain instances, the area computing application 114 may detect a pair of regions with effective connectivity as part of a skyline based on anomaly events, such as a traffic accident. The mining of frequent sub-graph patterns further provides deeper analysis of any flaws in the urban area.

The area computing application 114 mines the skyline patterns by utilizing different supports. The area computing application 114 calculates a support of a sub-graph pattern using the following equation:

$$\text{support}(g) = \frac{|\{G | g \subseteq G, CG\}|}{num \text{ of days}}$$

where g represents the sub-graph pattern, G is a skyline graph, and CG represents a collection of skyline graphs across multiple days. The denominator denotes the number of days that the dataset is analyzed over.

For example, the support of $r_4 \rightarrow r_5$ is 1 since this transition appears in the skyline graphs of all three days while that of $r_3 \rightarrow r_6$ is ⅔ since it only appears in DAY 2 and DAY 3. For a threshold δ, the area computing application 114 selects the support ≥δ. The patterns represent flaws present in the planning of the urban area, in which the patterns appear prominent and frequent.

Figure 12:
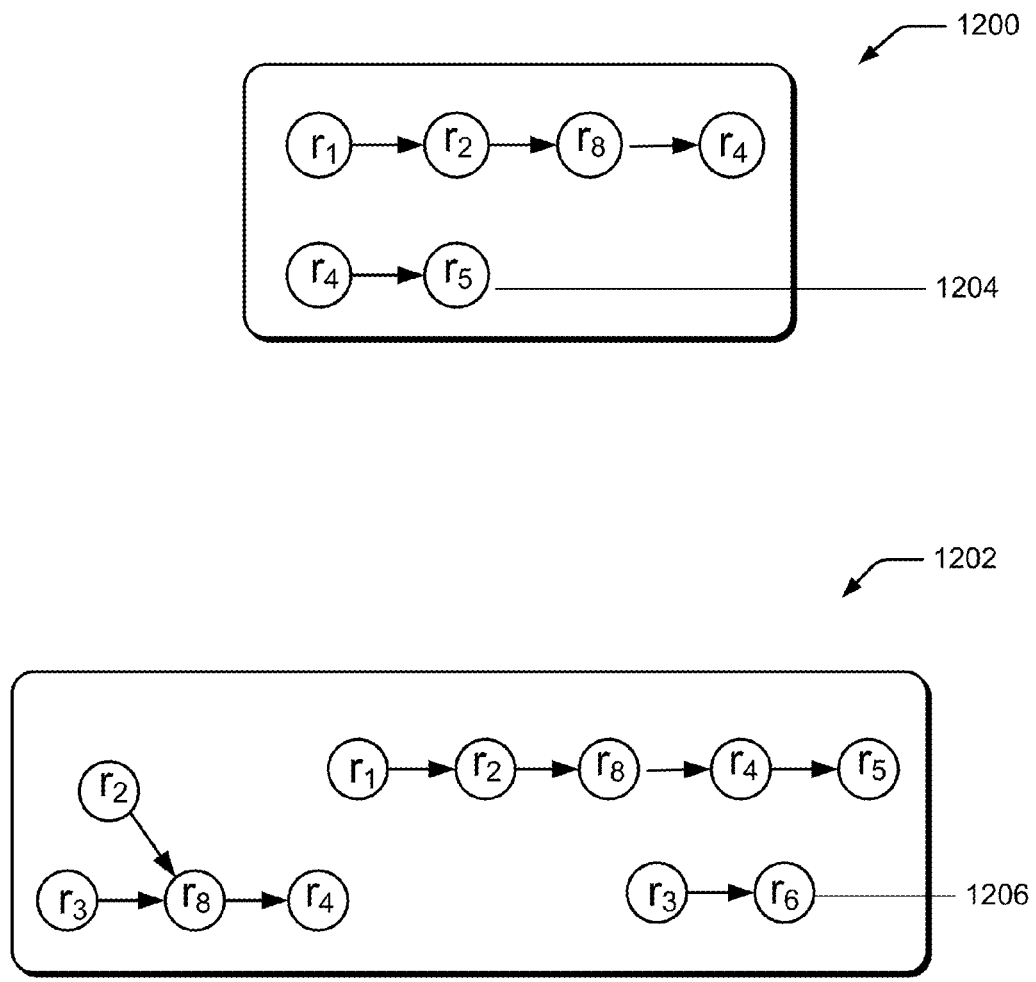
FIG. 12 illustrates examples of mined frequent skyline patterns.

FIG. 12 illustrates examples of mined frequent skyline patterns at 1200 and 1202. The area computing application 114 associates individual pairs of regions to determine any causalities and/or relationships among the regions to better understand how a problem may be derived. The area computing application 114 mines association rules among the patterns according to the following equations for support and confidence:

$$\text{Support}(g_1 \Rightarrow g_2) = \frac{|g_1 \cup g_2|}{num \text{ of days}}$$

$$\text{Confidence}(g_1 \Rightarrow g_2) = \frac{|g_1 \cup g_2|}{|g_1|}$$

where $|g_1 \cup g_2|$ denotes the number of days that $g_1$ and $g_2$ both occurred and $|g_1|$ indicates the number of days having $g_1$.

Two patterns may formulate an association rule, denoted as $g_1 \rightarrow g_2$, if the support of $g_1 \rightarrow g_2 \geq \delta$ and the confidence ≥Θ (i.e., a given threshold). For instance, at 1200, the association rules illustrate $(r_4 \rightarrow r_5)$ at 1204→$(r_3 \rightarrow r_6)$ at 1206 which includes a support of ⅔ and a confidence of ⅔. In yet another example, $(r_3 \rightarrow r_6)$ at 1206→$(r_4 \rightarrow r_5)$ at 1204 which includes a support of and a confidence of 1.

The association rules may include two or more patterns. For instance, $g_1, g_2 \rightarrow g_3$, where $g_3$ has a very high probability (conditioned by δ and Θ) to occur when $g_1$ and $g_2$ appear simultaneously. However, the sub-graph patterns may not be geospatially close to each other, revealing the causality and correlation between flawed planning without any relationship in the geographical spaces.

In an implementation, the planning service 106 presents the user interface 110 on the display of the computing device 102, after the user 108 activates the planning service 106. The user interface 110 gives the user 108 access to the area computing application 114 provided by the planning service 106. The user input may be for a request for a particular urban area to evaluate flaws in the planning.

Once the planning service 106 receives the input or query from the user 108, the planning service 106 accesses the model constructed from analysis of the logs of the route-oriented vehicles 118. The construction of the model was previously described with reference to FIGS. 4-8.

Figure 13:
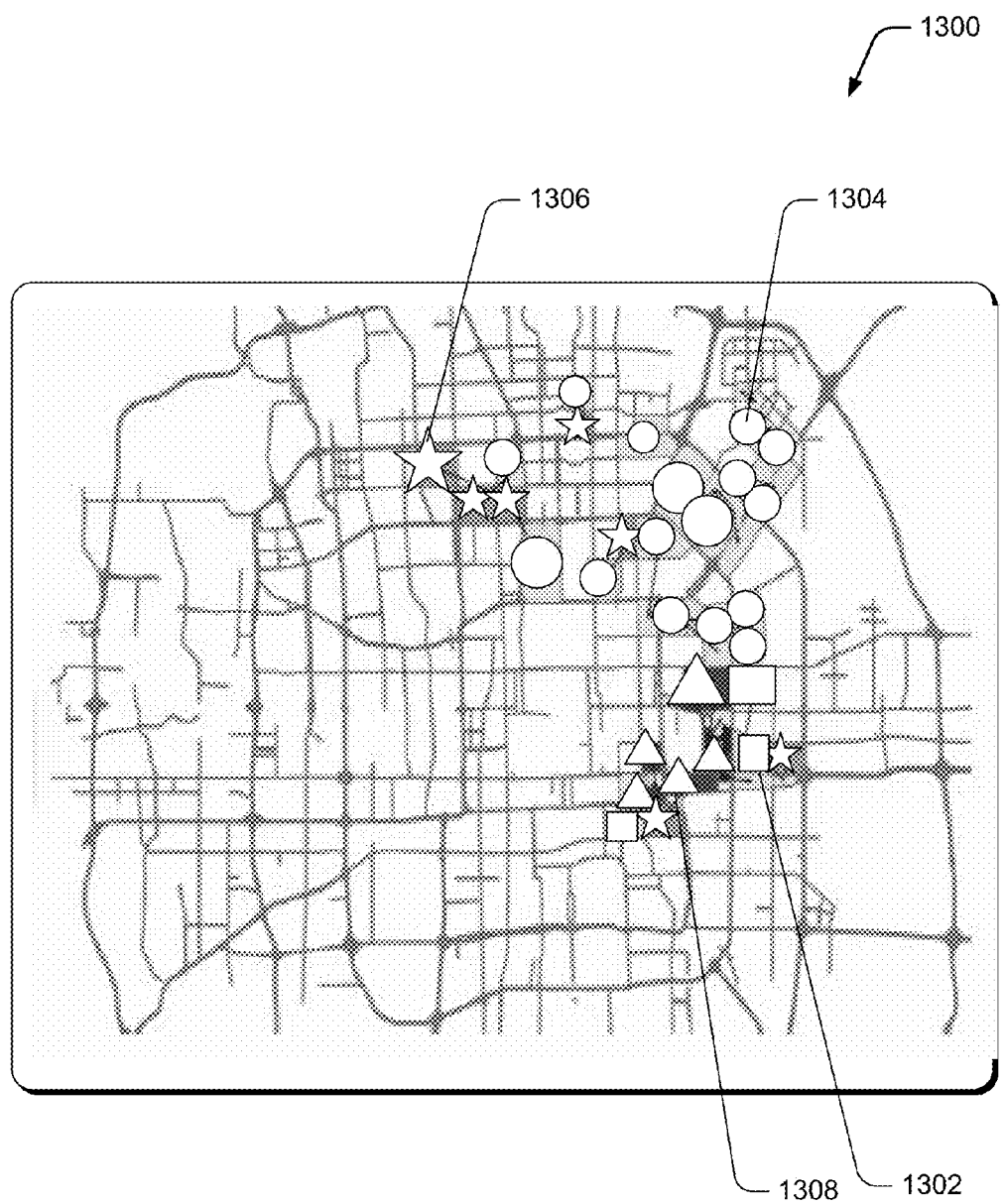
FIG. 13 illustrates an example heat map of the urban area using shapes to represent a number of passengers reaching the regions.

FIG. 13 is an example heat map 1300 as computed by the area computing application 114 and presented to the user 108 on the user interface 110. As mentioned, the area computing application 114 from the planning service 106 may be provided by a network service provider, a web application, an application based on a live search map, an application stored in memory of a computing device, and the like.

The heat map 1300 represents the flaws in the urban area based on detecting the frequent sub-graph patterns. The heat map 1300 includes frequency that a region has been detected as a flaw. For instance, a shape represents different frequency levels of flaws in the regions. In an implementation, a square represents a smallest level of frequency of flaws 1302 for the regions shown with the squares, while a circle represents a small level of frequency of flaws 1304 for the regions shown with the circles. Also, a star represents a middle level of frequency of flaws 1306 for the regions shown with the stars and a triangle represents a high level of frequency of flaws 1308 for the regions with the triangles. In another implementation, arrows may be used to indicate the direction of the transition from one region to another region.

Based on this evaluation of the heat map 1300, the recommendations may include building new roads, widening existing roads, converting roads to one way streets, adding new roads, adding local businesses such as shopping malls in the regions outsourcing people (i.e., land-use planning), adding subways or bus routes in these regions.

Example Server Implementation

Figure 14:
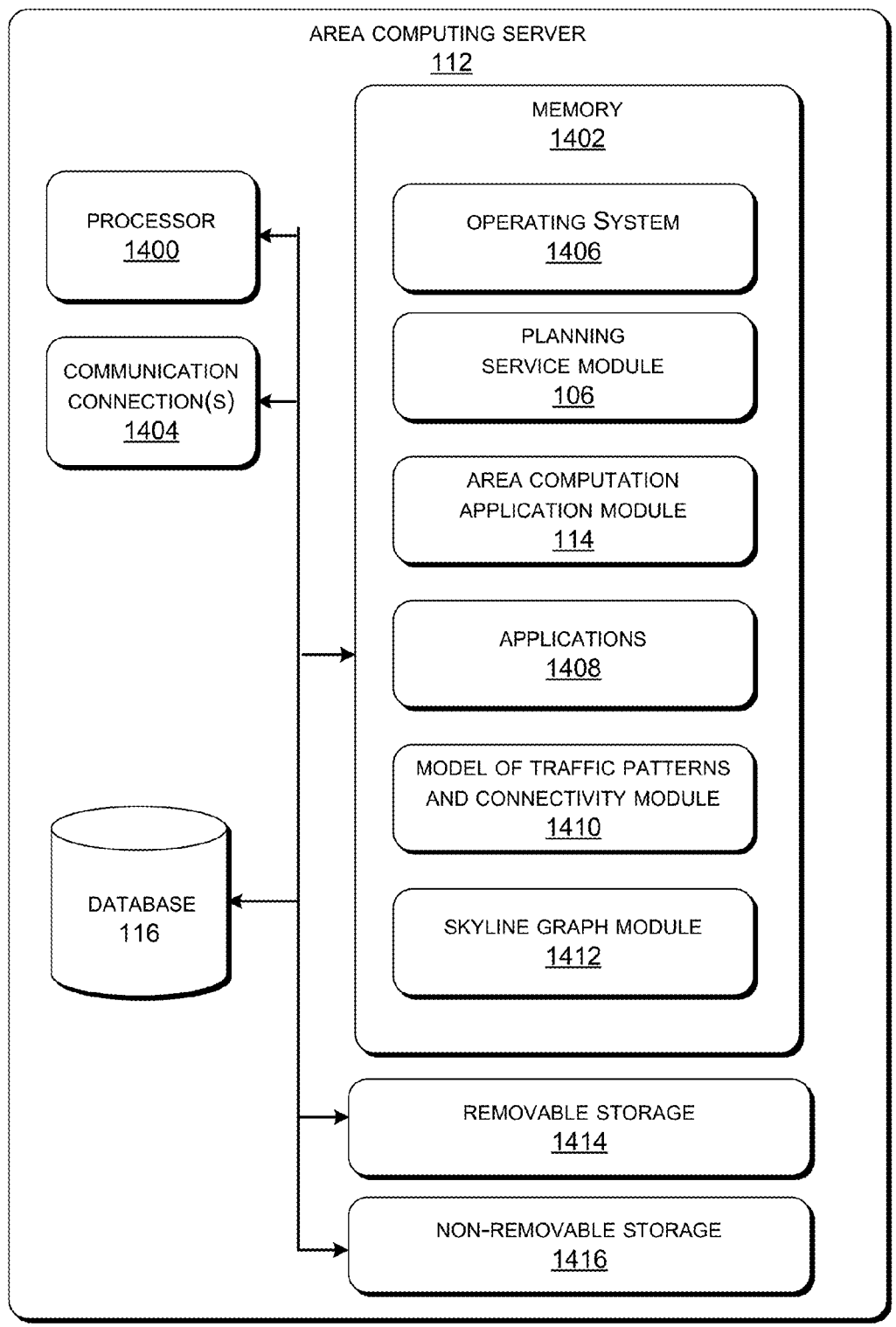
FIG. 14 is a block diagram showing an example server usable with the environment of FIG. 1.

FIG. 14 is a block diagram showing an example server 112 to be used for the planning service 106 and/or the area computing application 114. The area computing server 112 may be configured as any suitable system capable of services, which includes, but is not limited to, implementing the planning service 106 for evaluating the planning of urban areas, such as provide the map of the urban area with flaws in the urban area due to traffic congestion, insufficient number of roads travelling through the regions, insufficient number of lanes on existing roads, insufficient land use, and the like. In one example configuration, the server 112 comprises at least one processor 1400, a memory 1402, and a communication connection(s) 1404. The processor(s) 1400 may be implemented as appropriate in hardware, software, firmware, or combinations thereof. Software or firmware implementations of the processor(s) 1400 may include computer-executable or machine-executable instructions written in any suitable programming language to perform the various functions described.

Similar to that of computing environment 100 of FIG. 1, memory 1402 may store program instructions that are loadable and executable on the processor(s) 1400, as well as data generated during the execution of these programs. Depending on the configuration and type of computing device, memory 1402 may be volatile (such as random access memory (RAM)) and/or non-volatile (such as read-only memory (ROM), flash memory, etc.). Thus, memory 1402 includes volatile and nonvolatile, removable and non-removable media implemented in any method or technology for storage of information, such as computer-readable instructions, data structures, program modules, or other data.

The communication connection(s) 1404 may include access to a wide area network (WAN) module, a local area network module (e.g., WiFi), a personal area network module (e.g., Bluetooth), and/or any other suitable communication modules to allow the area computing server 112 to communicate over the network(s) 104.

Turning to the contents of the memory 1402 in more detail, the memory 1402 may store an operating system 1406, the planning service module 106, the area computing application module 114, and one or more applications 1408 for implementing all or a part of applications and/or services using the planning service 106.

The one or more other applications 1408 may include an email application, online services, a calendar application, a navigation module, a game, and the like. The memory 1402 in this implementation may also include a model of traffic patterns and connectivity module 1410 and a skyline graph module 1412.

The area computing application module 114 may perform the operations described with reference to the figures or in combination with the planning service module 106, the model of traffic patterns and connectivity module 1410, and the skyline graph module 1412.

The server 112 may include the database 116 to store the collection of GPS logs, trajectories, graphs, routes, models, maps of urban areas, and the like. Alternatively, this information may be stored on other databases.

The server 112 may also include additional removable storage 1414 and/or non-removable storage 1418 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 1402 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable storage media.

The server 112 as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computer-implemented method comprising:
   enabling a wireless coupling between a computing device including a processor and global positioning system (GPS) receiving devices of route-oriented vehicles through a wireless communication network;
   receiving through the wireless communication network, by the processor, sequences of GPS points of the route-oriented vehicles, the GPS points being obtained by the GPS receiving devices of the route-oriented vehicles;
   identifying, by the processor, geographical locations from the sequences of GPS points in which the geographical locations represent on urban area where the route-oriented vehicles travelled as recorded in the sequences GPS points;
   modeling, by the processor, traffic patterns in the urban area by:
     partitioning the urban area into regions based at least in part on roads that form borders between regions;
     segmenting the GPS points into time slots and identifying two or more of the GPS points that each include a status of vehicle occupancy indicating that each of the two or more GPS points is associated with transporting a passenger in one or more of the route-oriented vehicles has at least on a sensor that detects the passenger;
     projecting the two or more GPS points associated with transporting the passenger onto the regions to construct transitions associated with transporting the passenger between one or more pairs of the regions; and
     building a matrix of the regions for each time slot in each day based on a number of the transitions; and
   providing, by the processor, one or more recommendations using the modeled traffic patterns creating at least one new traffic route, the new traffic route replacing a previous area unavailable for travel by the route-oriented vehicles.

2. The computer-implemented method of claim 1, wherein the GPS points are analyzed from similar time spans in a year.

3. The computer-implemented method of claim 1, wherein the time slots comprise:
   separating the GPS points into (a) weekdays and (b) weekends and/or holidays of a year; and
   dividing a time of a day into multiple time slots based on the traffic patterns in the urban area.

4. The computer-implemented method of claim 1, wherein the transitions are associated with an arrival time, a departure time, a travel distance, and a travel speed between one or more pairs of the two or more GPS points.

5. The computer-implemented method of claim 1, wherein the matrix includes items to represent effectiveness of connections between each of the one or more pairs of the regions.

6. The computer-implemented method of claim 1, further comprising:
   identifying a pair of regions having a set of transitions between the pair of regions; and
   aggregating the transitions to associate the pair of regions with a volume of traffic between the pair of regions, expected travel speeds of the transitions, and a ratio between an actual travel distance for transitions between the pair of regions and a Euclidean distance between a first centroid of a first region of the pair of regions and a second centroid of a second region the pair of regions.

7. The computer-implemented method of claim 1, further comprising identifying a set of skylines from the matrix of the regions to represent flaws in planning of the urban area, the set of skylines representing GPS points with travel speeds and ratios of actual travel distance and to Euclidean distance between centroids of regions of each of the one or more pairs of the regions that are less efficient than other GPS points.

8. The computer-implemented method of claim 1, further comprising:
   identifying a plurality of pairs of regions, each pair of regions of the plurality of the pairs of regions having a set of transitions between the pair of regions, each pair of regions of the plurality of the pairs of regions in a set of skylines having properties of:
   a small travel speed between the set of transitions and a small ratio between an actual travel distance of the set of transitions and a Euclidean distance between centroids of regions of the pair of regions;
   a small travel speed between the set of transitions and a large ratio between an actual travel distance of the set of transitions and a Euclidean distance between centroids of regions of the pair of regions; and
   a large travel speed between the set of transitions and a large ratio between an actual travel distance of the set of transitions and a Euclidean distance between centroids of regions of the pair of regions; and
   identifying from the plurality of the pairs of regions, an identified pair of regions having the small travel speed and the large ratio as requiring the route-oriented vehicles to take detours based on congested traffic for travelling between the identified pair of regions.

9. The computer-implemented method of claim 8, further comprising:
   building skyline graphs for each day b connecting the plurality of the pairs of regions in the skylines with consecutive time slots in which the plurality of the pairs of regions are spatially close to each other;
   detecting sub-graph patterns from the skyline graphs to identify the plurality of the pairs of regions with traffic problems and to determine a casualty and a relationship among the plurality of the pairs of regions; and
   providing the one or more recommendations based on an analysis of a planning of the urban area based on at least on the sub graph patterns being detected, the recommendations include building roads, suggesting a bus route; or suggesting a subway line.

10. One or more computer storage media encoded with instructions that, when executed by a processor, perform acts comprising:
    enabling a wireless coupling between a computing device including the processor and global positioning system (GPS) receiving devices route-oriented vehicles over a wireless communication network;
    receiving, in the wireless communication network, sequences of GPS points obtained tot the GPS receiving devices of the route-oriented vehicles, individual of the GPS points comprising a status of vehicle occupancy associated with transporting a passenger based at least on a sensor that detects the passenger;
    creating a traffic and connectivity model that models a relationship of traffic of the route oriented vehicles travelling through regions in an urban area;
    generating a matrix of the regions from the model to identify a connectivity between the regions, the identifying the connectivity between the regions comprising:
        identifying a pair of the regions having a set of transitions between the pair the regions;
        aggregating the set of transitions to associate the pair of regions with a volume of traffic between each of the pair regions, expected travel speeds of transitions between the pair of regions, and a ratio between an actual travel distance for transitions between the pair of regions and a Euclidean distance between a first centroid of a first region of the pair of the regions and a second centroid of a second region of the pair of the regions; and
        mining information from the aggregated set of transitions for effectiveness of connectivity in the regions with reference to the matrix; and
    providing, by the processor, one or more recommendations using output of the identified, connectivity between the regions identifying at least one new traffic route, the new traffic route replacing a previous area unavailable for travel by the route-oriented vehicles.

11. The computer storage media of claim 10, further comprising:
    presenting a user interface to receive a user query for the urban area;
    searching the traffic and connectivity model for the urban area being queried, which is represented by a map of the urban area partitioned hr roads and streets; and
    providing the one or more recommendations for adding a shopping area; adding a subway line, or widening roads based at least in part on the traffic and connectivity model and the effectiveness of the connectivity in the regions.

12. The computer storage media of claim 10, further comprising identifying a set of skylines from the matrix of the regions to represent flaws in planning of the urban area, the set of skylines representing GPS points with travel speeds and ratios of actual travel distance to a Euclidean distance between centroids of regions of each of the one or more pairs of the regions that are less efficient than other GPS points.

13. The computer storage media of claim 10, further comprising identifying a plurality of pairs of regions having a set of transitions between each of the plurality of the pairs of regions, the plurality of the pairs of regions in the set of skylines having properties of a small travel speed between a set of transitions and a large ratio between an actual travel distance of the set of transitions and a Euclidean distance between centroids of regions of each of the plurality of pairs of regions, to cause the route-oriented vehicles to take detours based on congested traffic for travelling between the identified plurality of pairs of regions.

14. The computer storage media of claim 10, further comprising creating the traffic and connectivity model by:
   partitioning the urban area into the regions based at least in part on roads that at least partially define a border between two or more of the regions;
   segmenting the GPS points into time slots and identifying two or more of the GPS points as being associated with transporting a passenger in the route-oriented vehicles;
   projecting the two or more GPS points associated with transporting the passenger onto the regions to construct the transitions associated with transporting the passenger between the one or more pairs of the regions; and
   building the matrix of the regions for each time slot in each day based on a number of the transitions.

15. The computer storage media of claim 10, further comprising:
   presenting a user interface to receive a user query for the urban area; and
   presenting on the user interface the one or more recommendations for the urban area being queried, the recommendations include converting streets to one way streets, adding more lanes to streets, adding more roads, adding another subway line, adding a bus stop, or adding a train stop based at least in part on effectiveness of connectivity in the regions.

16. The computer storage media of claim 10, further comprising:
   presenting a user interface to receive a user query for the urban area; and
   presenting on the user interface a display a heat map of the urban area being queried, the heat map illustrating frequency of flaws in the regions ranging from a least amount of frequency of flaws, a mid level of frequency of flaws, and a high level of frequency of flaws based at least in part on the effectiveness of connectivity in the regions.

17. A system comprising:
   a memory;
   a processor coupled to the memory to perform acts comprising:
   enabling a wireless coupling between the system and global positioning system (GPS) receiving devices of route-oriented vehicles a wireless communication network;
   receiving, via the wireless communication network, geographical locations obtained by the GPS receiving devices of the route-oriented vehicles such that the geographical locations represent an urban area where the route-oriented vehicles travelled;
   accessing a model of traffic patterns in the urban area by partitioning regions in the urban area and projecting GPS points onto the regions to construct transitions of the GPC points from a first region to a second region, individual of the GPS points comprising a status of vehicle occupancy based at least on a sensor that detects a passenger;
   creating a skyline chart to identify a portion of the urban area where ratios of actual travel distance for transitions between a pair of regions to Euclidean distance between centroids of each region of the pair of regions associated with GPS points are larger than ratios of actual travel distance for transitions between an additional pair of regions to a Euclidean distance between centroids of each region of the additional pair of regions associated with other GPS points; and
   providing, by the processor, one or more recommendations based on a determination in the skyline chart of at least one new transition from the first region to the second region, the new transition replacing, a previous area unavailable for travel by the route-oriented vehicles.

18. The system of claim 17, further comprising:
   collecting logs of the route-oriented vehicles, which include a sequence of GPS points; and
   selecting trajectories from the logs, the selected trajectories representing trips associated with transporting passengers to desired destinations.

19. The system of claim 17, further comprising partitioning the GPS points into time slots based on a time of a day and a weekday, a weekend, and/or a holiday.

20. The system of claim 17, further comprising:
   dividing the portion of the urban area with the GPS points into time slots;
   detecting sub-graph patterns from the GPS points from the skyline chart based on the time slots; and
   formulating skyline graphs based on pairs in regions from consecutive time slots as being connected when spatially close to each other.

* * * * *